(12) United States Patent
Mutter

(10) Patent No.: US 12,147,976 B2
(45) Date of Patent: *Nov. 19, 2024

(54) SYSTEMS AND METHODS FOR PEER-TO-PEER TRANSMISSION OF DIGITAL ASSETS

(71) Applicant: HEALTH ALLIANCE MANAGEMENT, LLC, St. Louis, MO (US)

(72) Inventor: Zachary Mutter, Niceville, FL (US)

(73) Assignee: HEALTH ALLIANCE MANAGEMENT, LLC, Niceville, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/462,550

(22) Filed: Sep. 7, 2023

(65) Prior Publication Data

US 2023/0419307 A1 Dec. 28, 2023

Related U.S. Application Data

(63) Continuation of application No. 17/509,216, filed on Oct. 25, 2021, now Pat. No. 11,790,352, which is a (Continued)

(51) Int. Cl.
*G06Q 20/36* (2012.01)
*G06F 3/06* (2006.01)
(Continued)

(52) U.S. Cl.
CPC ....... *G06Q 20/3678* (2013.01); *G06F 3/0604* (2013.01); *G06F 3/0655* (2013.01);
(Continued)

(58) Field of Classification Search
CPC .......... G06Q 20/3678; G06Q 20/3829; G06Q 20/3827; G06Q 20/389; G06Q 20/10;
(Continued)

(56) References Cited

U.S. PATENT DOCUMENTS 10,438,290 B1 * 10/2019 Winklevoss ........ G06F 16/1815
10,755,241 B2 * 8/2020 Langschaedel ...... G06Q 20/363
(Continued)

OTHER PUBLICATIONS

Patil ("How to setup blockchain url for bitcoin operations?", Sep. 4, 2017, retrieved from https://stackoverflow.com/questions/46035702/ho-to-setup-blockchain-url-for-bitcoin-operations-what-will-be-the-base-url-fo, 4 pages (Year: 2017).*

*Primary Examiner* — James D Nigh
(74) *Attorney, Agent, or Firm* — McKee, Voorhees & Sease, PLC

(57) ABSTRACT

This disclosure relates to transaction systems and particularly to transaction systems of a peer-to-peer nature for digital assets. The asset transfer system may store user, user accounts, and transaction information in associated logic tables within a memory of a server hosting the asset transfer system. Through the use of, but limited to, curl functions, the asset transfer system may communicate with remote servers housing user wallets and user wallet information to perform transactions of digital assets between users. Before verification and proof of work can be established to complete the transfer of digital assets, the asset transfer system may report to the users of a transaction the details of the transaction. Users of the asset transfer system need not know encrypted or random keys to perform such digital asset transactions and may transfer digital assets only by identification of a username stored within the asset transfer system.

20 Claims, 23 Drawing Sheets

Related U.S. Application Data continuation of application No. 16/370,591, filed on Mar. 29, 2019, now Pat. No. 11,157,898.

(60) Provisional application No. 62/650,473, filed on Mar. 30, 2018.

(51) Int. Cl.
*G06Q 20/38* (2012.01)
*G06Q 20/06* (2012.01)
*G06Q 20/10* (2012.01)
*G06Q 20/22* (2012.01)

(52) U.S. Cl.
CPC ....... *G06F 3/0673* (2013.01); *G06Q 20/3829* (2013.01); *G06Q 20/3827* (2013.01); *G06Q 20/389* (2013.01); *G06Q 2220/00* (2013.01)

(58) Field of Classification Search
CPC ........... G06Q 20/223; G06Q 20/38215; G06Q 20/3825; G06Q 20/065; G06Q 2220/00; G06F 3/0604; G06F 3/0655; G06F 3/0673
USPC .......................................................... 705/71
See application file for complete search history.

(56) References Cited

U.S. PATENT DOCUMENTS

| | | | |
|---|---|---|---|
| 10,922,629 B2* | 2/2021 | Browne | G07C 9/20 |
| 2015/0262176 A1* | 9/2015 | Langschaedel | G06Q 20/3678 |
| | | | 705/44 |
| 2017/0154331 A1* | 6/2017 | Voorhees | H04L 9/3255 |
| 2018/0191503 A1* | 7/2018 | Alwar | H04L 9/3242 |
| 2019/0287095 A1* | 9/2019 | Gaddam | G06Q 20/36 |
| 2019/0287175 A1* | 9/2019 | Hill | G06Q 40/04 |
| 2021/0035091 A1* | 2/2021 | Maeng | G06Q 20/3674 |

* cited by examiner

SYSTEMS AND METHODS FOR PEER-TO-PEER TRANSMISSION OF DIGITAL ASSETS

CROSS REFERENCE TO RELATED APPLICATIONS

This non-provisional patent application is a continuation of and claims priority to U.S. patent application Ser. No. 17/509,216 entitled "Systems and Methods for Peer-to-Peer Transmission of Digital Assets", filed Oct. 25, 2021, which is a continuation of and claims priority to U.S. patent application Ser. No. 16/370,591 entitled "Systems and Methods for Peer-to-Peer Transmission of Digital Assets", filed Mar. 29, 2019, and now U.S. Pat. No. 11,157,898 issued Oct. 26, 2021, and claims priority to U.S. Provisional Patent Application No. 62/650,473, filed Mar. 30, 2018, and entitled "Systems and Methods for Peer-to-Peer Transmission of Digital Assets", the entire disclosures of which are incorporated herein by reference. herein incorporated by reference in their entireties, including without limitation, the specification, claims, and abstract, as well as any figures, tables, appendices, or drawings thereof.

INTRODUCTION

This disclosure relates generally to asset transfer systems, and, more particularly, to transfer of digital assets from one user to another through use of the asset transfer system. Digital assets can include cryptocurrency and digital currency but is not necessarily limited thereto.

In disclosed embodiments, the asset transfer system solves the difficulties and limitations of sending and receiving digital currency/assets with a simple solution. The asset transfer system utilizes existing digital currency technology to allow users to transfer and share the following but not limited to Bitcoin (BTC), Ethereum (ETH) and Litecoin (LTC) with ease. The asset transfer system is a peer-to-peer digital currency sharing technology which allows a digital currency user to send and receive digital currency by means of a simple user name. The user can receive and send BTC, ETH and LTC without using the cumbersome 32-digit address/public key or accompanying QR code. When transferred, the Bitcoin, Ethereum and Litecoin would be deposited into the users integrated & secured account within the asset transfer system without the hassle of having to remember a 32-digit long account, public key, or have an image of a QR code. The asset transfer system provides users with no additional mining costs or account fees.

In additional embodiments, the asset transfer system also offers users a paid premium feature known as "cold storage" whereby digital currency is held offline. The asset transfer system may be offered both online as an accessible webpage or by a downloadable application housed on either a computing system or a personal computing device.

Unlike similar transaction systems, the asset transfer system never acts as an intermediary between sender and receiver of digital currency. The asset transfer system does not take possession of any digital currency being transmitted between users. The only time the asset transfer system may take possession of digital currency is between a cold storage service user and a transaction. Whatever is put into cold storage is returned to the user who placed it into cold storage originally. Never does the asset transfer system act as an escrow service and send digital currency to another user on behalf of a third user. Additionally, traditional transfer systems transmit fiat currency (e.g., US dollars), which is considered notes issued and backed by government or institutional entities. The asset transfer system may be used for such transfers, but is advantageously designed for sending digital currency which falls into a category of digital assets. The asset transfer system can accommodate sending and receiving funds not backed by a particular government agency or commercial institution. In conventional systems, users are allowed to remove currency from the currency system when they so choose. Digital assets and digital currencies do not operate in this manner. No individual ever owns a BTC/ETH/LTC. What users possess is a small place within the block-chain that the digital currency reside. How much those block-chain users possess is measured in the form of a digital token, both in whole numbers and in fractions of a number. Unlike fiat currency, these digital currencies cannot be removed from the block-chain, just placed elsewhere within the chain. The methods, actions, and transmissions of the asset transfer system are completely different from the traditional currency transaction not only in the way funds are moved, but that the funds themselves are an entirely different permutation of currency assets.

Further features and advantages of the disclosed embodiments, as well as the structure and operation of various elements of the disclosed embodiments, are described in detail below with reference to the accompanying drawings.

BRIEF DESCRIPTION OF THE DRAWINGS

The accompanying drawings, which are incorporated in and form a part of the specification, illustrate the disclosed embodiments and together with the description, serve to explain certain inventive principles. In the drawings:

FIG. 12 shows an example statement GUI when a registered user logs into the asset transfer system and accesses the statement page according to an embodiment of the disclosure.

FIG. 15 illustrates a privacy policy GUI when a user of the asset transfer system is taken to the privacy policy page according to an embodiment of the disclosure.

DETAILED DESCRIPTION

Figure 1:
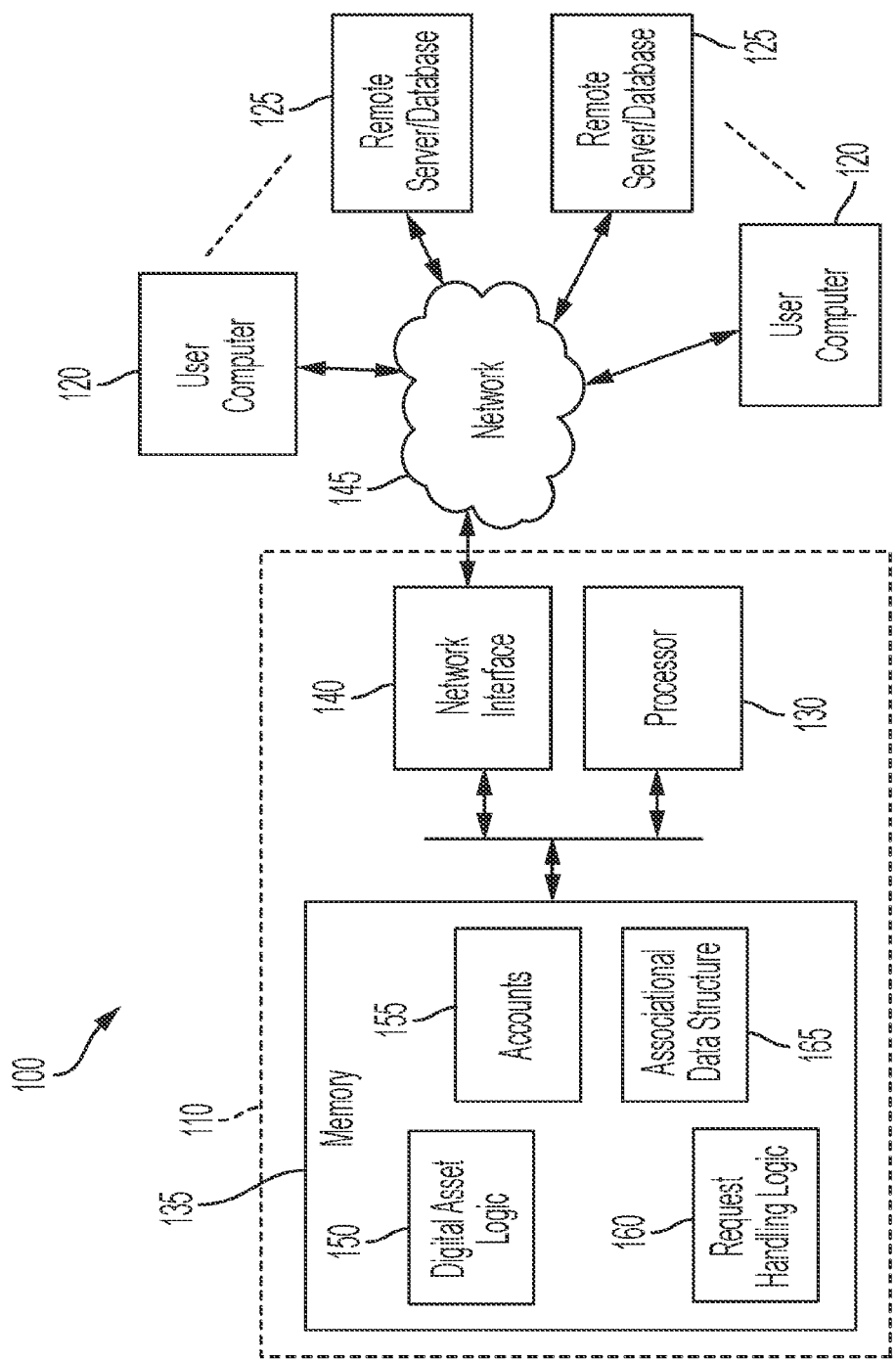
FIG. 1 illustrates an example asset transfer system according to an embodiment of the disclosure.

Referring to the accompanying drawings, FIG. 1 illustrates an example asset transfer system 100. The asset transfer system 100 can be employed as a free to operate software platform, a software-as-a-service (SaaS) platform, or may also be a software platform purchasable and licensed for use on a user's computer. As a SaaS platform, the asset transfer system 100 may be implemented as part of computer system 110 operating as one or more servers. The computer system 110 comprises a processor 130, a memory 135, and a network interface 140. The processor 130, memory 135, and network interface 140 can interconnect with each other in any of a variety of manners (e.g., via a bus, via a network, etc.)

The network interface 140 can provide an interface for the computer system 110 to a network 145. The network 145 can be any suitable communication network or combination of communication networks, such as the Internet, wired and wireless telecommunication networks, etc. Through network 145, the asset transfer system 100 can interact with a plurality of user computers 120 and a plurality of databases 125 to transfer digital assets between users. The user computers 120 and/or databases 125 can take the form of any suitable computer (such as a desktop computer, laptop computer, tablet computer, smart phone) or larger computer system. The network interface 140 may take any suitable form for carrying out network interface functions, examples of which include an Ethernet interface, a serial bus interface (e.g., Firewire, USB 2.0, etc.), a chipset, and antenna adapted to facilitate wireless communication, and/or any other interface that provides for wired and/or wireless communication. The network interface 140 may also include multiple network interfaces. Other configurations are possible as well.

The processor 130 may comprise one or more processors such as general-purpose processors (e.g., a single-core or multi-core microprocessor), special-purpose processors (e.g., an application-specific integrated circuit or digital-signal processor), programmable-logic devices (e.g., a field programmable gate array), etc., that are suitable for carrying out the operations described herein.

To provide direction to a user of the asset transfer system 100, the computer system may have a display (not shown) capable of showing a user a graphical user interface (GUI). The display may function as a user input device. The GUI may interact with the user dependent upon the device used to access the asset transfer system 100. In certain embodiments, the asset transfer system 100 may be located on the computer system 110 and viewed on the display by executed web page code to display a website hosted by a database of the computer system 110. The website may have a URL address to access the web page code on the display. In other embodiments, the asset transfer system 100 may be located on a personal computing device having a computer system 110. The personal computing device may store and execute the asset transfer system 100 as an application, or a mobile application for portable personal computing devices, for use by the user. In every embodiment, a user may interact with the GUI to access and execute the features of the asset transfer system 100. In some embodiments this may be accomplished by inputting keyboard or mouse commands to an input device of the computer system 110, and in other embodiments, use of a touch screen or pressure sensitive display may be used to navigate the asset transfer system 100.

The memory 135 of the computer system 110 may comprise one or more non-transitory computer-readable storage mediums, such as volatile storage mediums (e.g., random access memory, registers, and/or cache) and/or non-volatile storage mediums (e.g., read-only memory, a hard-disk drive, a solid-state drive, flash memory, and/or an optical-storage device). The memory 135 may also be integrated in whole or in part with other components of the computer system 110. Further, the memory 135 may be local to the processor 130. It should be understood that the memory 135 (or portions of memory) could be remote from the processor 130, in which case the processor 130 may access such remote memory through network interface 140 (or some other network interface).

The memory 135 may store software programs or instructions that are executed by processor 130 during operation of the computer system 110. For example, the memory 135 may store the asset transfer system 100. Within the memory 135, different logical processes may be stored, which can take the form of a plurality of instructions configured for execution by processor 130. The memory 135 may also store digital asset logic 150, which can take the form of a plurality of instructions configured for execution by processor for receiving, processing, delivering, and transferring digital assets to appropriate user accounts 155. The memory 135 may also store request handling logic 160, which can take the form of a plurality of instructions configured for execution by processor for controlling how users are granted access to their accounts 155.

Memory 135 may also be configured as a database or other storage design where a set of memory addresses are arranged as a plurality of accounts 155 for users. In some embodiments, digital assets intended for receipt by a user can be stored in the account 155 for that user. Other memory addresses in the memory can store an associational data structure 165. This data structure 165 defines the associations that exist between user accounts 155, digital asset storages, users, and transfer action recordations that allow the computer system 110 to receive, transfer, and account for digital asset management between users and their appropriate accounts 155. It should be understood that the associational data structure 165 can be a single data structure or a plurality of data structures. It should be understood that the memory addresses used for accounts 155 or the associational data structure 165 need not be contiguous memory addresses. Moreover, which memory addresses are allocated to which accounts 155 and which memory addresses are allocated to accounts versus the associational data structure 165 can be fluid and change over time as the content of memory changes.

Figure 2:
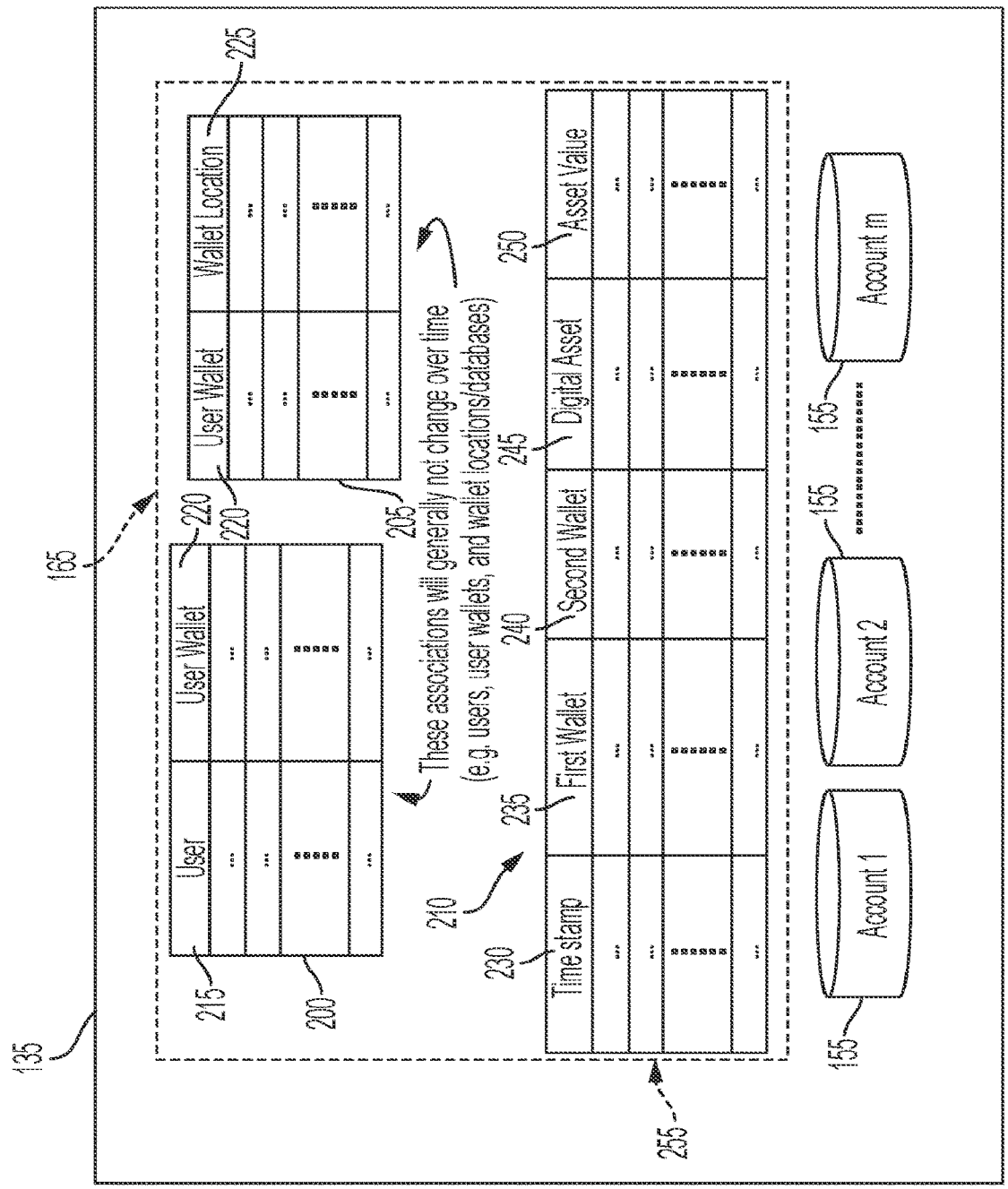
FIG. 2 illustrates data structure associations of the asset transfer system according to an embodiment of the disclosure.

FIG. 2 shows an example of memory 135 that includes an example embodiment of an associational data structure 165 where the associational data structure 165 includes a first data structure 200, a second data structure 205, and a third data structure 210. FIG. 2 also shows an example where the memory 135 includes a plurality of accounts 155, where each account can be associated with a different user of the asset transfer system.

In FIG. 2, a first data structure 200 associates users 215 with user wallets 220. As indicated above, the asset transfer system 100 is envisioned for transferring digital assets, such as but not limited to digital currency and cryptocurrencies between users of the asset transfer system 100. To transfer digital assets between users, the users must have access to a user wallet 220 used to house their digital currencies. In the area of cryptocurrency wallets, these digital wallets may be stored in a plurality of different locations. The asset transfer system 100 is envisioned to be able to pull information relating to these user wallets 220 from their respective storage locations based on permissions granted by the user 215. For example, a user wallet 220 may be an exchange wallet housed on a third party exchange platform for transferring digital assets between users 215. In such an example, the asset transfer system 100 does not maintain or store the user wallet 220 within the memory 135 of its computer system 110. Only identification information is transferred to the asset transfer system 100 to ensure transfer, reception, and acceptance of digital assets can be confirmed and executed. In other examples, the user wallet 220 may be a hot wallet. In these examples, the hot wallet may be an electronic wallet stored on a third party server or database not directly connected to an exchange. For example, these hot wallets may be online websites which house the user identification information and the user wallet 220, an application based wallet which may be accessible on a mobile computing platform which contains user identification information, or a locally stored wallet on a personal computing device of a user which also contains user identification information. Finally, the asset transfer system 100 is envisioned to also be used with cold wallets in some embodiments of the disclosure. Cold wallets store user identification information in the wallet "offline" and away from electronic access. Examples of cold wallets include, but are not limited to, physical hardware which may be inputted into a computer system 110 to access the cold wallet and user identification information or a simple paper recording of user identification information for the cold wallet.

In the embodiment of FIG. 2, the first data structure 200 can be implemented as a logical table where each row in the table identifies a user 215 and his/her associated user wallets 220. In many instances, users 215 may maintain multiple user wallets 220 for different types of digital currency to be transmitted or received using the asset transfer system 100. The second data structure 205 associates user wallets 220 with wallet location databases 225 (e.g., exchange, hot, or cold wallet and storage location), and user public keys. Each user wallet 220 can be mapped to a user account 155 in the memory 135. In this example, an additional data structure (not shown) can be implemented as a logical table where each row in the table identifies a public key and its associated user account 155. The wallet location database 225 is important as the location of the stored wallet on a third party server or local computing device is needed to determine where the user identification information resides.

In many embodiments, associating a user public key with both a user wallet 220 and wallet location database 225 provides the functional basis of the asset transfer system 100. To transfer digital assets between users, it must be known who is the sender and recipient of the digital asset transfer. In normal business, this is easily identifiable as individuals commonly transfer funds to other individuals based on the known names of the parties. However, in cryptocurrency transactions, it is not common knowledge to know the identity of the underlying individuals who will receive or transmit the digital assets. When a user 215 opens a user wallet 220 for storage of digital assets, a user is given a public key for said user wallet 220. That public key also may act as the user's address for the user wallet 220. This is part of the user identification information that is needed for the transfer of digital assets. In many examples, the public key is a 32-bit address identifying the user wallet 220 of the user 215. It may be randomly generated and because of its complexity, it will be difficult for a user 215 to remember the exact sequence of characters used as the public key. Public keys function as identifying addresses for cryptocurrency asset transfers. To transfer cryptocurrency assets, such as tokens or coins, a user 215 must know the public key of the recipient. The recipient is only identifiable to the public as the public key with no additional identifying information. Thus, the disclosed asset transfer system 100 may allow a user 215, if he/she so wishes, to identify themselves as an owner of a wallet 220 by associating the user wallet 220 with the public key within the memory.

Furthermore, the wallet locational database 225 provides identifying information as to the server, platform, and/or location of the user wallet 220. When transferring digital assets, the asset transfer system 100 must know the correct server/database/wallet location to contact to complete the transaction process. For example, if the digital asset transfer is to occur between exchange wallets, the asset transfer system 100 must access the server of the exchange to process the transaction. This also verifies that the transaction between the users 215 can occur so that transfer of digital assets on platforms which are not supported cannot be completed.

The third data structure 210 associates timestamps 230 with a first wallet 235, a second wallet 240, a digital asset 245, and an asset value 250. In this example, the third data structure 210 can be implemented as a logical table where each row in the table identifies each of the above as a transaction 255. The asset transfer system 100 performs transaction commands to move digital assets between users 215. While the asset transfer system 100 does not, itself, perform the underlying transaction, transaction commands are sent to the appropriate server/database to facilitate execution of the requested transaction. After a transaction 255 is executed by the asset transfer system 100, the transaction 255 can be recorded and associated to the appropriate user accounts 155 so that information relating to the transaction 255 may be reported back to the user 215. Queries sent to the identified server/database executing the transaction can verify the transaction process and update the asset transfer system 100 in real-time.

A timestamp 230 for each transaction 255 is recorded within the logic table of the third data structure 210. The timestamp 230 reports transaction executable queries sent to the appropriate server by the user 215 initiating the transaction 255. The transaction 255 is deemed executed when this query is submitted and a timestamp recording of the reception of this query by the outside server/database serves as the timestamp 230 showing the time and date when a transaction 255 was placed.

Furthermore, the third data structure 210 provides both a first wallet 235 and a second wallet 240 within the logic table. For example purposes, the first wallet 235 may be the wallet of the sender of digital assets 245 while the second wallet 240 may be the recipient of the digital assets 245. This order may be interchanged, but it should be understood that the columns must match those of senders and recipients of transactions 255. In this embodiment, the first wallet 235 identifies the sender of the digital assets 245. Accessing the second or additional data structure, the public key of that user wallet 220 may be retrieved to be sent with the query to the outside server/database to facilitate the transaction 255. Likewise, the second wallet 240 may be the intended destination of the digital assets 245. Accessing the second or additional data structure, the public key of the second wallet 240 may be retrieved so that the transfer from the first wallet 235 to the second wallet 240 may be completed. As stated above, users may have multiple user wallets 220 used to house multiple types of digital assets 245. These user wallets 220 may be used to transfer assets on a predetermined platform. The digital asset 245 of the transfer is recognized and recorded based at least in part on the outside server storing the user wallet 220 information for the transaction 255. Finally, the logic tables record an asset value 250 for the amount of the digital assets 245 that are transferred between the wallets 235 and 240.

While these data structures 200, 205, and 210 are described by way of example as being implemented as tables in memory, it should be understood any data structure capable of creating an associational link between data elements may be employed if desired by a practitioner (e.g., linked lists, object arrays, etc.). Furthermore, each value of these data structures 200, 205, and 210 may be associated with the appropriate user account 155 of the plurality of user accounts within the asset transfer system 100.

As stated above, the asset transfer system 100 is envisioned to be in communication with multiple outside servers and databases 125. The asset transfer system 100 executes these communication to obtain access to user wallets 220, obtain and access user identification information (such as public and private keys), and to facilitate transfer of digital assets 245 between users 215.

Figure 3:
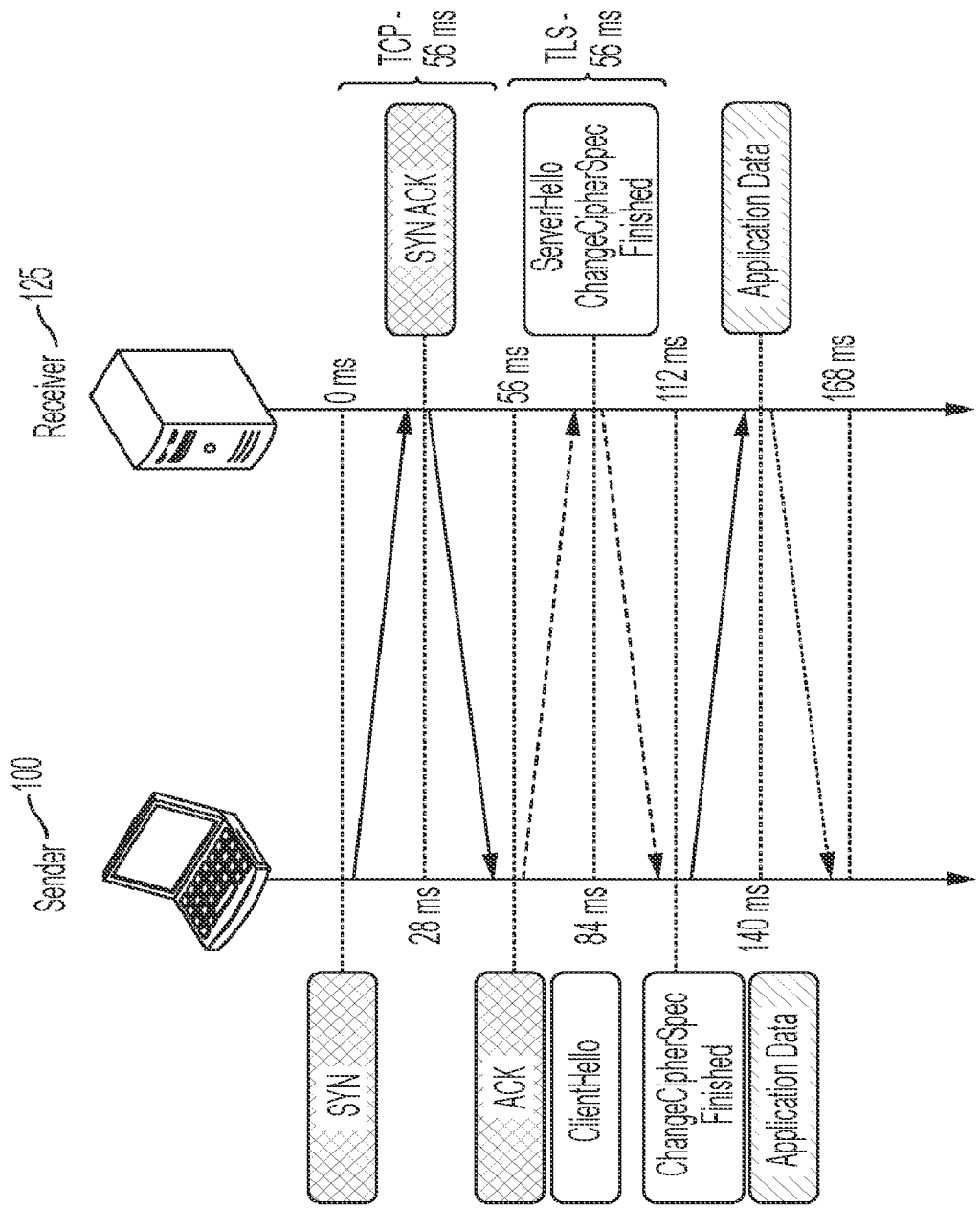
FIG. 3 shows an example embodiment where the asset transfer system communicates with an outside server/database to obtain user identification information and/or user wallet information according to an embodiment of the disclosure.

FIG. 3 shows an example embodiment where the asset transfer system 100 communicates with an outside server/database 125 to obtain user identification information and/or user wallet 220 information. To get access to a user's wallet 220, the asset transfer system 100 executes code to first open a secured socket layer (SSL) which established a connection between the asset management system database and the outside database/server 125 storing the user wallet 220 which is queried for connection. Both public and private keys (if present) are validated based on known user information for access to the respective user wallet 220 in this step. The asset transfer system's session data is loaded as well to the user wallet 220. If this data is not loaded, a user 215 of the asset transfer system 100 will not have access or see his/her user wallet 220 or the associated public key within the asset transfer system 100.

To accomplish this, the database storing the asset transfer system 100 talks to an API (application program interface) of the outside server/database 125 to collect user data. If no user data is captured, no actions can be made by the asset transfer system 100. Calls are made by the asset transfer system 100 to the outside server/database 125 to ensure a real-time connection is established. If no calls are made, then the asset transfer system 100 proceeds to additional communication processing steps. After a seamless connection is established with the outside server/database 125, the user 215 need not leave the asset transfer system platform to complete and execute digital asset transactions 255. To accomplish this, a curl function is executed by the computer system 110 storing the asset transfer system 100 to interact with the user wallet 220 of the outside server/database 125 in the exact same way as if the user 215 was accessing the user wallet 220 through a direct connection, such as a website URL, of the outside server/database 125. The user experience on the asset transfer system 100 is easy, enjoyable, and has all the same actions a user would experience on the outside server/database interface.

The extension curl function allows the asset transfer system program code to connect to the respective URLs of whichever outside server/databases 125 houses the digital currency user wallet 220. The curl function lets users 215 experience the actions of interaction with their user wallet 220 like they were on the URL of whichever wallet they want without having to leave the asset transfer system 100. The asset transfer system 100 runs actions of the user wallets 220 within its code via, but not limited to, the curl function. Curl functions may be programmed to operate and connect to various outside server/databases 125. Examples of these outside server/databases 125 which house user wallets 220 may include, but are not limited to, Block.io stored wallets and Coinbase stored wallets. Of course, the asset transfer system 100 may implement curl functions to any type of outside server/database 125 to seamlessly interact with user wallets 220 without leaving the confines of the asset transfer system 100. While curl functions are one possible communication protocol used to communicate between the asset transfer system 100 and the outside server/database 125, it should be understood that additional functions may be present to establish the same or similar communication. These functions may include, but are not limited to, public function send, public function statements, $data public function processpayment, try(response), function construct, and elseif. Thus, there are multiple ways to establish a similar communication process between the asset transfer system 100 and the outsider server/database 125 besides use of the curl function.

Calls are also made by the asset transfer system 100 to send actions to the outside server/database 125 that may house a user wallet 220. These calls are made to confirm verification of access to the user wallet 220 and to facilitate transactions 255 between digital assets 245. As stated above, the asset transfer system 100 is envisioned to be used with several different digital asset platforms or currency. The below examples illustrate how some of these calls are made to particular cryptocurrency platforms, but it should be understood that similar calls can be made to any type of digital asset platform by the asset transfer system 100.

In the Coinapult platform, calls are made when a user wishes to send a Bitcoin. Bitcoin is the only digital currency this user wallet 220, in the Coinapult platform, is capable of sending/receiving at the time of this writing. The asset transfer system 100 sends this call to the Coinapult server which returns whether or not the action can be done on the user wallet 220. The Coinapult server must verify that the user wallet 220 has enough Bitcoin to cover the amount they wish to send including the sending fee charged by the Coinapult server.

In the Spectro platform, when a user 215 wishes to send digital currency they must also send out calls. Through the asset transfer system 100, calls are sent via the Spectro server which creates movement of the type of digital currency the user 215 wishes to move. The Spectro platform has several digital currencies that it can receive and send. The asset transfer system 100 is not bound or limited to any one type of digital currency as any digital currency can be integrated into the asset transfer system 100. For ease of use, and to capture largest user base, the asset transfer system 100 as of this writing only integrates the three most popular digital currencies (or cryptocurrencies): Bitcoin, Litecoin and Ethereum, but other additional cryptocurrencies are envisioned to be added as they progress.

On the Luno platform, a very similar process occurs. An SSL connection is established between the Luno platform and the asset transfer system 100. This connection allows for sending login credentials, access tokens generated, and the curl function. This allows the transfer process to occur without ever having to leave the asset transfer system 100.

As stated above, the asset transfer system 100 is envisioned to be operable on a number of different platforms. The following example utilizes the Coinapult platform for communication and transfer of digital assets 245. It should be understood that this disclosed embodiment is not limited solely to this platform and similar communication algorithms can be established to provide similar functionality on other platforms. The following example, shows how the asset transfer system 100 communicates with the Coinapult platform to complete a digital asset transaction.

In the asset transfer system 100, the arrangement of the curl function with the use of Coinapult platform works in a similar way as discussed above. To first initiate the session for the user 215, the curl function loads the fields for the user 215 and establishes the connection to the Coinapult platform via SSL and the user's credentials. Secondary code is also used when retrieving user data such as address information related to the user's public key. The secondary code makes sure the user account information is accurate to ensure a user of the asset transfer system 100 will not be able to use an account that is not theirs. Similar code is used for acquiring tokens and verifying the user data. Following this connection, the user's information is verified via the keys (i.e., public keys and/or private keys) that the user created and stored in the asset transfer system 100 and the keys in the Coinapult account the user 215 created and stored. If these keys do not match, the user 215 will not have access to their Coinapult account and the asset transfer system 100 will make the user 215 aware whether they do or do not have access to the specified accounts. Coding algorithms are used when the user has established a connection to the Coinapult server and for verifying the user's keys to be able to use the attached Coinapult account.

When the user 215 performs a request via the asset transfer system 100, the request is sent through curl URL. If the execution of the request fails during the request, it is returned to the asset transfer system 100 and no data is sent to the asset transfer system server. Therefore, no false positives are noted keeping statements of the asset transfer system 100% accurate. Curl requests which are to be acted on are contained in the asset transfer system code and associated algorithms. This code and algorithms have cascading confirmations which allows for this functionality. Once execution is performed by the asset transfer system 100, a fail-safe confirms if the objective of the code was successful. Only after success is confirmed by the asset transfer system 100 are keys entered and kept encrypted so user data remains secure during communication between the remote server (Coinapult platform) and the asset transfer system server.

Figure 4A:
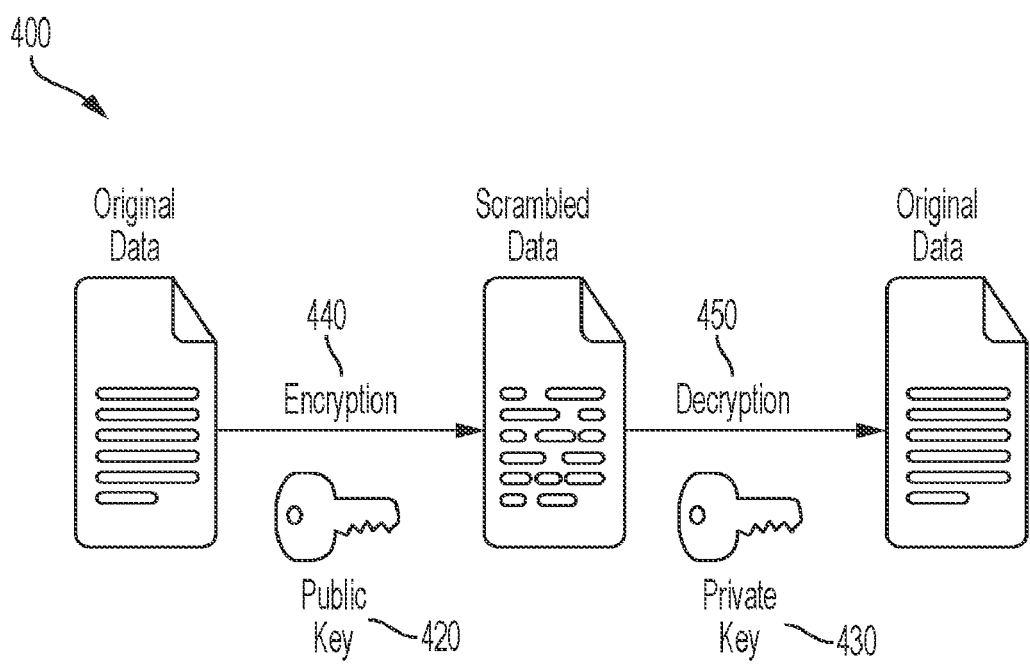
FIG. 4A shows a high level flow chart of how the transmission of key information is obtained and encrypted between the remote server and the server storing the asset transfer system according to an embodiment of the disclosure
Figure 4B:
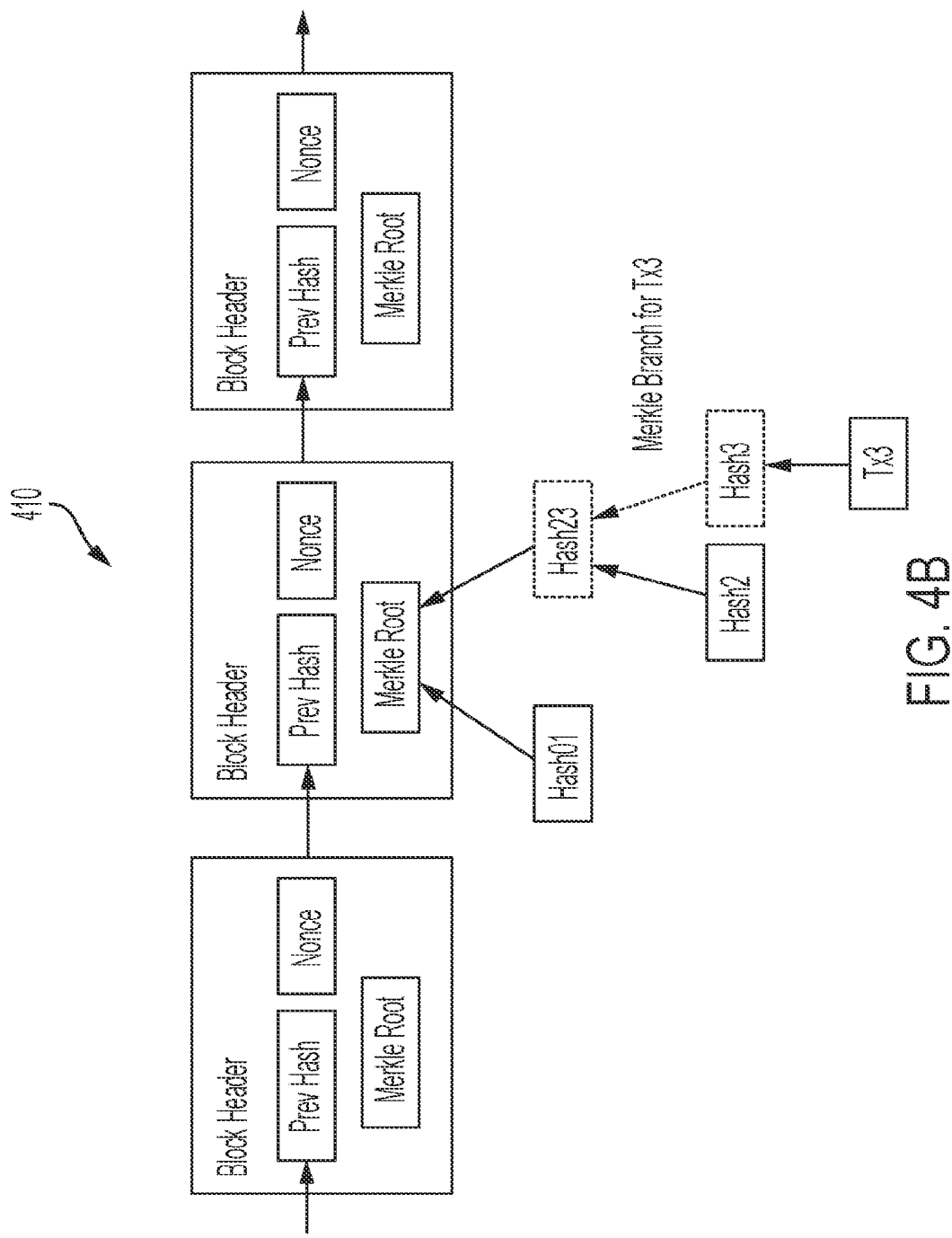
FIG. 4B shows a high level proof-of-work chain for a block associated with the transfer of digital assets according to an embodiment of the disclosure.

FIG. 4A provides a high level flow chart of how the transmission of key information 400 is obtained and encrypted between the remote database 125 and the computer system 110 storing the asset transfer system 100. FIG. 4B provides a high level proof-of-work chain 410 for a block associated with the transfer of digital assets 245. User information and the user wallet 220 (also known as address or formally called by its technical name of a public key 420) is confirmed by the asset transfer system 100 and action is performed upon the appropriate user account registered to user's public key 420 on the remote database 125. The exact same protocol is applied as would occur based on the protocol of the remote database 125 to transmit the go-ahead for digital currency movement in the asset transfer system 100.

The asset transfer system 100 does not possess private key 430 information of registered users 215. Private key 430 information is not stored on the computer system 110 of the asset transfer system 100 to protect the nature and importance of the private key 430. Transactions can be made, and private key inputs by the user 215 used to authorize the transaction of the digital asset 245. The digital asset 245 or currency may be thought of in embodiments of the present disclosure as a unique form of data that can be un-packaged and moved successfully to the receiver or a second user of the asset transfer system 100. For example, the remote database 125 housing the user wallet 220 communicates back key information as seen in FIG. 4A to the asset transfer system 100, and the asset transfer system 100 encrypts 440 data to protect the private key 430 of user but still allows functionality of the remote database based on inputs received by the asset transfer system 100 to fulfill wishes of user's call actions.

When sending key data via the asset transfer system 100, the key data is encrypted 440 and then deciphered 450. Strings are created in 64 bits, although other bit combinations are possible, and each part of key is secured. This strength of the encryption 440 further ensures that the key data is secured when being transmitted between users accessing the asset transfer system 100 and the remote database 125 storing their chosen user wallet 220. This encryption level prevents nefarious interception of raw data and possible double-spend of digital currency or digital assets 245. Double spending is essentially theft of digital currency that is most likely to occur during transactions 255 or fraudulent manipulation of the block-chain. The longer it takes a nefarious party to obtain important key data the better as keys could and may likely change with each communication between the asset transfer system 100 and the remote database 125. As additional security is implemented with the transfer of data pertaining to the work performed, the respective digital currency network further cements and verifies the placement of digital currency as it becomes harder to double-spend (steal) the digital currency or asset. For example, this security can be obtained by good manufacturing practice of the asset transfer system 100 which creates additional numbers and secures the value of the key. Thus, in one embodiment, the key turns the digital currency or asset into 64 bits for the remote database 125 to decode once successfully transmitted by the asset transfer system 100.

Further security layers may be added by the asset transfer system 100 to increase the security of the transmission shown above. Signatures may be added that are compatible with standard Digital Signature Algorithm (DSA) and Elliptic Curve Digital Signature Algorithm. These signatures provide verifiable authenticity where each value of the user's key is secured. For example, when transferring digital currency such as Bitcoin, these signatures go into the Bitcoin network and the Bitcoin is considered moved.

As referenced in FIG. 4B, blockchain proof-of-work 410 computation is examined and computed to verify ownership of the transferred digital asset 245 and to verify the transaction 255. The respective remote databases 125 connected to digital currencies networks, not the asset transfer system 100, handle the extensive computation power of hashing, encrypting, un-packing and then re-packing to confirm placement of digital currency (i.e., the digital data) in the block-chain. Although the asset transfer system 100 sends out the call to action for this network to perform such functionally, the asset transfer system 100 does not perform the computations of said network, but has the power to send out calls and create action to the network based in its communication with the remote database 125 in the exact same fashion as any remote database 125 directly accessing the digital currency/asset wallet system. For example, in some embodiments a security protocol using a keyed hash value, made up of 256 bits, can be used for this computation. The network or remote databases carry out further continuations of this process. The drain on the network is quiet immense and requires are large amount of processing power for more established digital currencies such as Bitcoin. Overall, this is known as the "mining process".

Additionally, the asset transfer system 100 works with the remote database 125 so that balances are always checked and each transaction 255 is measured with how much digital currency a user 215 has in a given user wallet 220. This disallows for double spending or spending more than what a user 215 has in his/her possession. For example, if a user 215 has one Bitcoin, they can only send one Bitcoin minus the corresponding transmission fees (also known as mining, sending, or receiving fees depending on the verbiage used by the respective remote server wallet system). For the asset transfer system 100 to be able to operate with the remote database 125, access tokens must be obtained first from the remote database 125. This common process occurs in all wallet systems, yet there is some slight variation in the way this is done with each particular wallet server and system. However, the principal code is common with each wallet system and server. Access must be granted via token or server-to-server communication sent between the remote database 125 and the asset transfer system 100. Some remote databases 125 hosting the wallet system use SMB systems with user access keys and valid wallet login credentials. A user 215 cannot move digital currencies without first obtaining successful access. For example, on the APIBTC platform, an APIBTC curl function may be employed with an URL of the site, but keeps the user in the asset transfer system 100. The curl function allows for retrieval of tokens which in turn allows for overall functionality of asset transfer system 100. The APIBTC platform employs a protocol similar to previously discussed platforms. Once again, access tokens are re-verified by the asset transfer system 100 and the APIBTC platform as well as user session ID, data, and balances. When a user moves digital currency from their APIBTC platform tokens, the tokens marked for sending are retrieved by the asset transfer system 100 through the APIBTC platform and, if this protocol fails, there is secondary redundant protocol to ensure the transaction occurs. Most user wallets 220 have secondary protocol if the primary protocol should fail. The APIBTC platform provides extra routes to ensure these actions can be taken. In some instances, the code at the end of the transaction is returned to the asset transfer system 100 to confirm if there was success or not for the transaction based on the placed actions of the asset transfer system 100. This return code ensures that statements generated by the asset transfer system 100 are not just immediate, but also authentic and accurate. Generating asset transfer system transaction information is not performed when the asset transfer system action is undertaken, but when the respective digital currency user wallet responds whether the action undertaken was successful or not.

Additionally, the asset transfer system 100 is envisioned for use with remote database platforms that allow the transmission of multiple types of digital assets 245 or currencies. For example, the Coinbase platform allows for such actions. After a call is made to the Coinbase server or after a transaction occurs on the Coinbase server, the asset transfer system 100 returns the users primary account so that they now have access and ability to send and receive any type of digital currency that the Coinbase wallet supports. By returning with primary account and address, users can send and receive any digital currency they have. One additional benefit is that, because this account can accept multiple digital currencies, any digital currency sent to a user 215 with a Coinbase account can accept it. As a loss-prevention protocol, the Coinbase server works in conjunction with the asset transfer system 100 so that users whose active account is not capable of accepting a particular type of digital currency being sent to them will not receive the username typed in by the sender.

The generalize code implemented by the asset transfer system 100 may be broken down into simplified components of generalized actions. For example, the following breakdown is of what different parts of the code may mean. Although almost all the different parts of code work the same function, the specific remote databases hosting the user wallet may have a slightly different API which requires different protocols to be used. However, in the end, the same functionality is achieved for all remote servers housing the user wallets 220. The asset transfer system 100 has a SSL created to retrieve private keys 430 within its code. These different components of the code are what is used to build the asset transfer system 100. Without these different pieces of code, any API of the remote database 125 with the user wallets 220 provided to the asset transfer system 100 is useless. By arranging the API from the different user wallets 220 with the asset transfer system code, the unique functionality of the asset transfer system 100 is created. Generalize coding examples of the asset transfer system 100 may include, but are not limited to:

ssl_key'—Path to the private key file.
ssl_cerf—Path to the public key certificate file.
ssl_ca'—Path to the certificate authority file.
ssl_ciphee—List of *allowed* ciphers to be used for the encryption, separated by colons (':')
'ssl_verify'—TRUE/FALSE; Whether verify the server certificate or not Sconfig['base_url']='any site'; This is the base site URL which leads users to the asset transfer system. It is from here that curl functions are later used which keeps user on the asset transfer system but lets the code link to the URL of other remote servers housing the wallets.

For example, for accessing a specific wallet server, the following example code may be employed:

$ config['WALLET SERVER_clientId']=
"wallet_27271dc7fca905c7af0acfb48a63c345";
$ config['WALLETSERVER_clientSecret']="test-secret";

The asset transfer system 100 can integrate any digital currency or asset in the world and allow users to send/receive digital currency by simple user names at no cost to the user. The only limitations on what digital currency or asset is able to be sent and received is limited by some the following pieces of code which can be updated continuously as the asset transfer system 100 adds additional digital assets to its transfer functionality:

$this→form_validation→set_error_delimiters('<p style="color: red">', '</p>');
  $this→form_validation→set rules('bitcoin', 'bitcoin', 'required');
  $this→form_validation→set rules('litecoin', 'required');
  $this→form_validation→set rules('ethereum', 'ethereum', 'required');
  if($this→form_validation→run( )==true) {
  $fields['am_bitcoin']=$this→input→post('bitcoin');
  $fields['am_ethereum']=$this→input→post ('ethereum');
  $fields['am_litecoin']=$this→input→post('litecoin');

The above example protocol lets the asset transfer system know the protocol to which each remote database housing the user wallet 220 the asset transfer system 100 is connecting with and where to make calls out. For example, not every remote database user wallet 220 is hosted on a website via a .com; some are .io and the protocol for them is slightly different. Enabling the asset transfer system 100 to utilize a composer auto loading setting will allow the asset transfer system 100 to look for a composer package auto-loader script in application/vendor/autoload.php. However, the asset transfer system 100 also may employ additional paths to take depending on the remote server wallets the administration of the asset transfer system 100 wishes to integrate.

Every transaction 255 of the asset transfer system 100, whether private/public or request sent, is categorized and logged into the statements page for users. The statement page is 100% accurate and gives users up to date information about any incoming transactions 255 before the receiver of funds has actually taken possession of the incoming digital currency or asset 245. Digital currency is only able to be sent as fast as the network processing is able to work. At times, this transmission of funds can take a few seconds, hours, or even days in some instances depending on the network load and priority of the sent digital funds. In the asset transfer system 100, a user 215 will know what amount of digital currency is inbound to them, for what reason it was sent, when it was sent, and by whom. The asset transfer system 100 accomplishes this by coding algorithms which first lay out the code in columns and report back if the transaction was successful or not, through the action Txn. Incorporating a Txn function will let the asset transfer system 100 know if the transaction 255 was a success or not thereby preventing false statements of actions that were unsuccessful and resulting in producing a statement page to the user that is only accurate. The accurate information is then 'echo'ed by cascading bits of information that build a string of quality and real data. The 'echo' thus may display an argument, return a result of a function, and have more parameters than a simple print function as an echo is faster than print when relayed back to a server.

Figure 5:
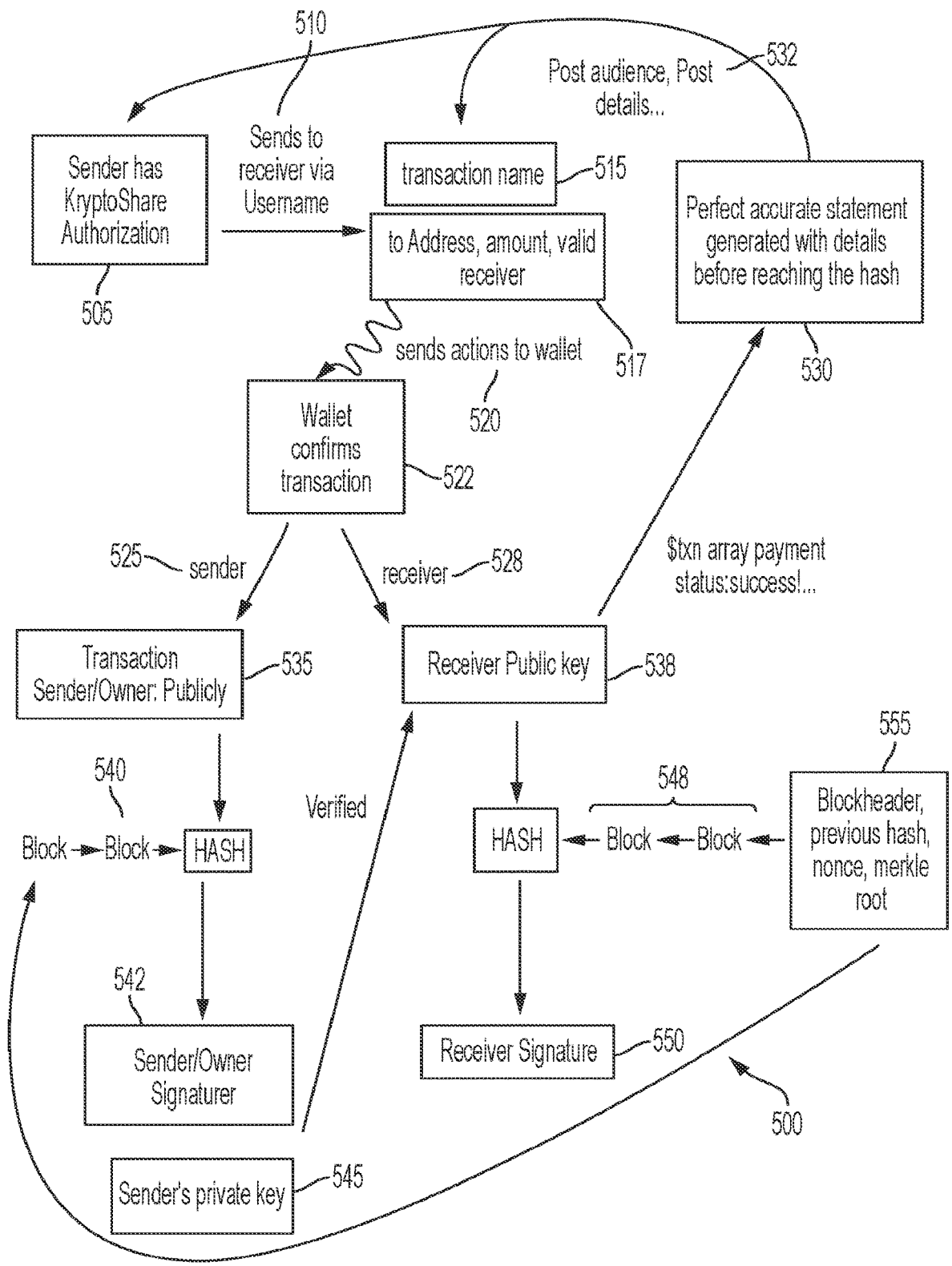
FIG. 5 provides an example flow chart of a complete transaction process utilizing the asset transfer system according to an embodiment of the disclosure.

FIG. 5 provides an example flow chart of a complete transaction process 500 utilizing the asset transfer system 100. To start the process, a user 215 must authorize 505 the asset transfer system 100 to use the selected user wallets 220 housed on remote databases 125 for transaction purposes. If allowed, the asset transfer system 100 may send an amount of digital assets 245 or currency to a receiver also identified by the asset transfer system 100 only by the known username 510 within the asset transfer system 100. In this regard, the sending and receiving of digital assets 245 such as cryptocurrencies does not require the sender and user to input and know each other's public key or specific wallet address. The asset transfer system 100 then names the transaction 255 with an identification, i.e., transaction name 515, and starts the transaction process with the remote database 125 via a call through a curl function. Information 517 pertaining to the transaction such as the address (public keys) of both the sender and recipient, transaction amount, and validity of the reception can be confirmed and reported back to both the sender and receiver of the asset transfer system 100.

The asset transfer system 100 then sends the call action 520 to the specific remote database 125 housing the user wallet 220. The remote database 125 confirms the user wallet's existence, i.e., transaction confirmation 522, and begins the actual transaction process. The remote database 125 then separates the transaction based on the sender 525 and recipient 528 public key information. In this manner, the remote database 125 has issued the transaction command initially inputted into the asset transfer system 100 and reports that the transaction 255 is now going to occur. The asset transfer system 100 can then receive this information to perform an accounting statement 530 on the upcoming transaction. The asset transfer system 100 will then produce this accounting statement 530 with the details of the transaction 255 before it has reached and has been entered into the correct hash back to both the sender and recipient in the asset transfer system 100. As digital assets 245, and cryptocurrencies in particular, grow in popularity and use, the actual verification of the transaction may take a long period of time. Infant currencies with low volume may have faster verification times to complete transactions, while well-established currencies like Bitcoin have longer processing times to complete transactions. Taking into account other issues such as priority of transactions on remote databases 125, transactions occurring with an attached transaction fee may be placed in a higher queue preference than those on which the remote database is not receiving a benefit. Therefore, transactions with no attached fees may be left in a proverbial no man's land waiting for proof-of-work whenever the network frees up. This may never occur with more popular currencies as proof-of-work algorithms are dependent on the collective processing power of the network and as long as new transactions 255 enter a queue at a higher priority, the no man's land transactions may never be verified. The asset transfer system 100 reports the transactions before verification to allow users to accommodate for such details and provide a real time update of their current digital asset holdings. Of course, once a transaction 255 is ultimately processed and verified, a confirmation message 532 may be reported back to the asset transfer system 100 and that information reported back with a statement to both the sender and the recipient of the digital asset.

Once the transaction 255 is split by the remote database 125 to the public key of the sender 535 and the public key of the recipient 538, the verification and proof of work algorithms begin. The remote database 125 verifies that the sender properly owns the amount of currency or asset that is to be sent by performing the proof of work 540 on the hash and blocks showing the ownership chain of the selected currency amount. Once it is verified that the sender is in actual possession of the currency amount to be transferred to the sender, the sender signature 542 by way of a private key 545 is added to the transaction information and transmitted to the entire remote server network for verification of the transaction 255. Brute computer processing is used to randomly seek and obtain the cryptographic authorization of the sent amount of currency with the sender's private key. Dependent on the rules of the remote database 125, once at least one node of the network verifies the transaction 255, the transaction 255 is added to the hash for ultimate implementation into the block showing the chain of custody for the amount of currency or asset. Normally, these remote servers require anywhere for three to six nodes to verify the transaction 255 before it is deemed to be added to the hash. After verification, the transaction 255 is added to the hash 548 and will be processed accordingly. Once processed, the recipient's signatures 550 is added to the transaction data and the transaction 255 is recorded as a new block of the chain. At this point, the transaction 255 is deemed complete, verified, and processed and may be reported back to the asset transfer system 100 for ultimate reporting back to the sender and recipient.

As stated above, the asset transfer system accounting statement 530 will be updated once the transaction 255 is created and before the receiver takes custody of the digital asset/currency 245. The transaction process may contain additional processing steps such as creating a nonce 555 within the hash after the transaction 255 is verified. Use of the nonce 555 is a form of electronic entropy allowing additional nodes to confirm from the nonce and thereby add their own nonce to the transaction 255 after successive verification. Before most of the verification process occurs, the page for the accounting statement 530 of the asset transfer system 100 is updated. For example, a Bitcoin transaction may take up to seven plus hours to verify a transaction 255 while the statement page 530 of the asset transfer system 100 may be created and displayed to the sender and receiver in less than a second.

As stated above, the asset transfer system 100 is envisioned to be easily assessable to a user 215. Thus, is some embodiments the asset transfer system 100 may be accessed online through a webpage URL. In other embodiments, the asset transfer system 100 may be a downloadable application stored on a user's computer system 110 or personal computing device. Regardless of the delivery method, access and functionality of the asset transfer system 100 is accomplished by displaying a series of graphical user interfaces (GUIs) to the end user of the asset transfer system 100.

Examples and functionality of the asset transfer system 100 will now be discussed in additional details within the following figures.

Figure 6:
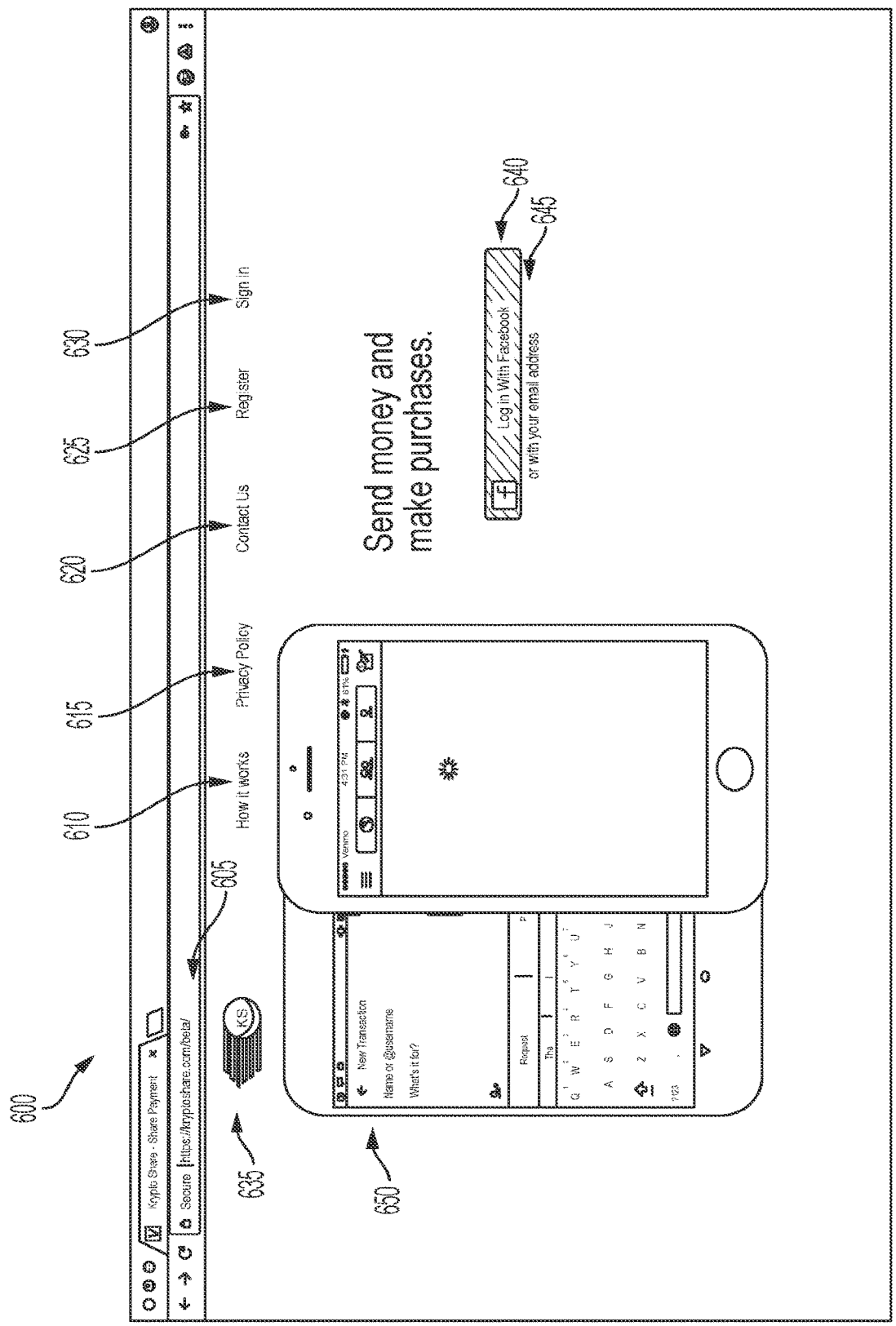
FIG. 6 shows a graphical user interface (GUI) a user of the asset transfer system may see when first communicating with a home screen according to an embodiment of the disclosure.

FIG. 6 shows a graphical user interface a user of the asset transfer system 100 may see when first communicating with a home screen 600. This example is the first GUI users of the asset transfer system 100 may see when they first enter a corresponding URL 605 into their web browser to connect with the asset transfer system server or when the user 215 logs onto a mobile application of either a personal computing device or a computer system 110.

The "How It Works" tab 610 of the GUI transfers the user 215 to a separate page dedicated to a discussion and brief description of the overall functionality, benefits, and uses of the asset transfer system 100. The "Privacy Policy" tab 615 of the GUI transfers the user 215 to a separate page that details the privacy policy of the asset transfer system 100 detailing the data and information obtained and controlled by the system and how that information may be used by the asset transfer system 100. The privacy policy section will appear whenever a user 215 signs up and registers with the asset transfer system 100. Users 215 may access and reacquaint themselves with the detailed policies anytime a user clicks or accesses the tab. Also located on this GUI is a "Contact Us" tab 620 which transfer the user 215 to a separate page where they can fill out a contact form or email to access support services for the asset transfer system 100. This tab may also display additional contact information such as a physical address and telephone number for support services. A "Register" tab 625 is located next to the "Contact Us" tab 620. The "Register" tab 625 will transfer the user 215 to a registration page where new users 215 will be required to fill out corresponding data fields. By completing the registration form in a correct manner, the asset transfer system 100 will automatically generate an email that gives the new user confirmation of the new account. In a two-step verification process, the new user may open the email and click a contained link to verify the registration. Finally, a "Sign In" tab 630 may be accessible which will transfer a user to a log-in page for their associated asset transfer system account 155. Thus, users 215 already registered with the asset transfer system 100 do not have to wait for a confirmation email to log into a preexisting account.

The homepage GUI 600 may also have a logo 635 present of the asset transfer system 100. The logo 635 may be seen in a common location and follow the user 215 in the same location on the different GUI screens shown to the user 215 as they navigate the asset transfer system 100. In FIG. 6, the logo 635 is in the upper left corner of the GUI and is a linked image that will take a user to the home page. If a user 215 has not logged in or registered they will need to do so otherwise the logo 635 will just take them to the same page homepage GUI 600.

A user 215 of the asset transfer system 100 may be able to log into the system by use of a third party authentication tool. In an example, a "Log In With Facebook" tab 640 may be offered to the user 215 to log in with a preexisting Facebook account. Of course, other social media websites and other third party credentials may be sent to the asset transfer system to verify the log in. With the "Log In With Facebook" tab 640, users 215 have the option to log in via their Facebook account. Upon selecting this option the user name field will automatically be generated with their Facebook first and last name in the register section and users will then create a username for the asset transfer system 100. Upon creating a user name, users will be able to select and link their respective user wallets 220. Their Facebook photo may also appear in as their icon, or avatar, when using the asset transfer system 100. The asset transfer system 100 does not post or communicate any electronic information to preexisting social media platforms such as Facebook, and only obtains generalized information such as a individuals name when populating the registration fields for the asset transfer system 100. Nothing will post to Facebook without the user's consent. Additionally, users do not have to choose the third party authorization tab to log into the asset transfer system. A user may also select the "Email Address" tab 645 and elect to use any active email of their choosing to access the asset transfer system account 155.

As the homepage GUI 600 of FIG. 6 is viewed to be accessible as a webpage, hosted on an asset transfer system server, a proper URL must be entered to access the webpage. This URL is envisioned to be a secure URL authorized to protect and encrypt user data based on third party security systems. This adds an additional layer of protection to the user 215 when using the asset transfer system 100 to facilitate transmission of digital currency. Also seen in FIG. 6 are example home screens 650 which may be displayed on a user's personal computing device when accessing the asset transfer system 100 via a mobile application. In these examples, the personal computing device may be a smartphone or tablet storing the asset transfer system, but providing the same resources and communication protocols as the asset transfer system 100 accessible by a webpage.

Figure 7:
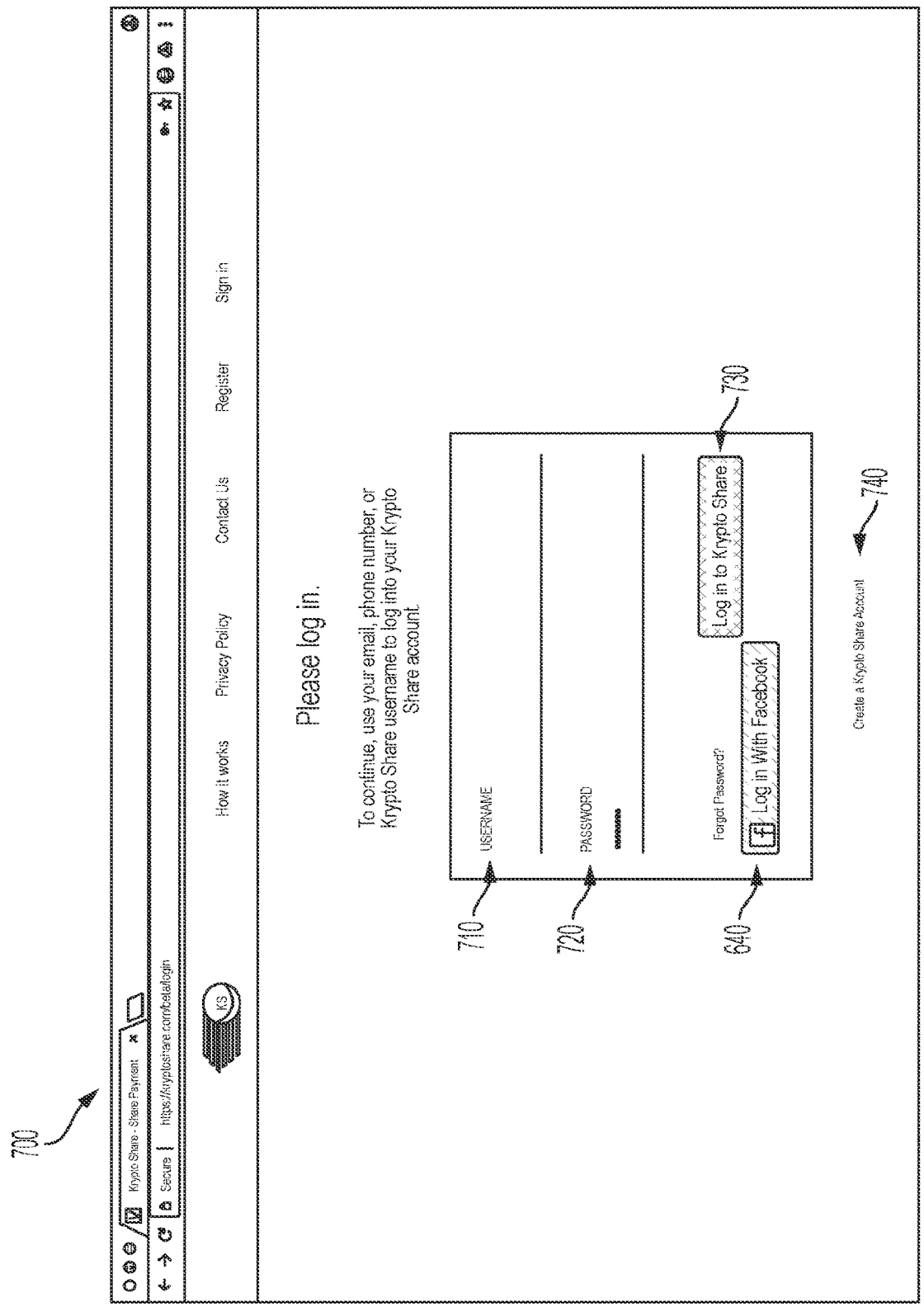
FIG. 7 shows an example login GUI when a user attempts to log into the asset transfer system according to an embodiment of the disclosure.

FIG. 7 shows an example login GUI 700 when a user attempts to log into the asset transfer system 100. This login GUI 700 is first shown to all users 215 to streamline the login process and determine whether a proper user account 155 of the asset transfer system 100 exists. Username 710 and password 720 fields are present so that users 215 who have already created an account 155 can type in the username 710 and password 720 they created when they first registered with the asset transfer system 100. A log into tab 730 is viewed for the asset transfer system 100. Once a user 215 correctly inputs the username 710 and password 720, the user 215 may click on this tab to access the asset transfer system 100. If the username 710 and password 720 entered are incorrect, an error message is reported to the user 215. A "Log In With Facebook" tab 640 is also offered like the similar tab on the homepage GUI 600. By clicking this tab, the user 215 may login in with the credentials from an authorized third party service so long as the user 215 is already registered with the asset transfer system 100. If the user 215 is new to the asset transfer system 100 or does not have an account, a "Create a KryptoShare Account" tab 740 is offered. Clicking this tab will transfer users 215 to a registration page so that they can register with the asset transfer system 100.

Figure 8:
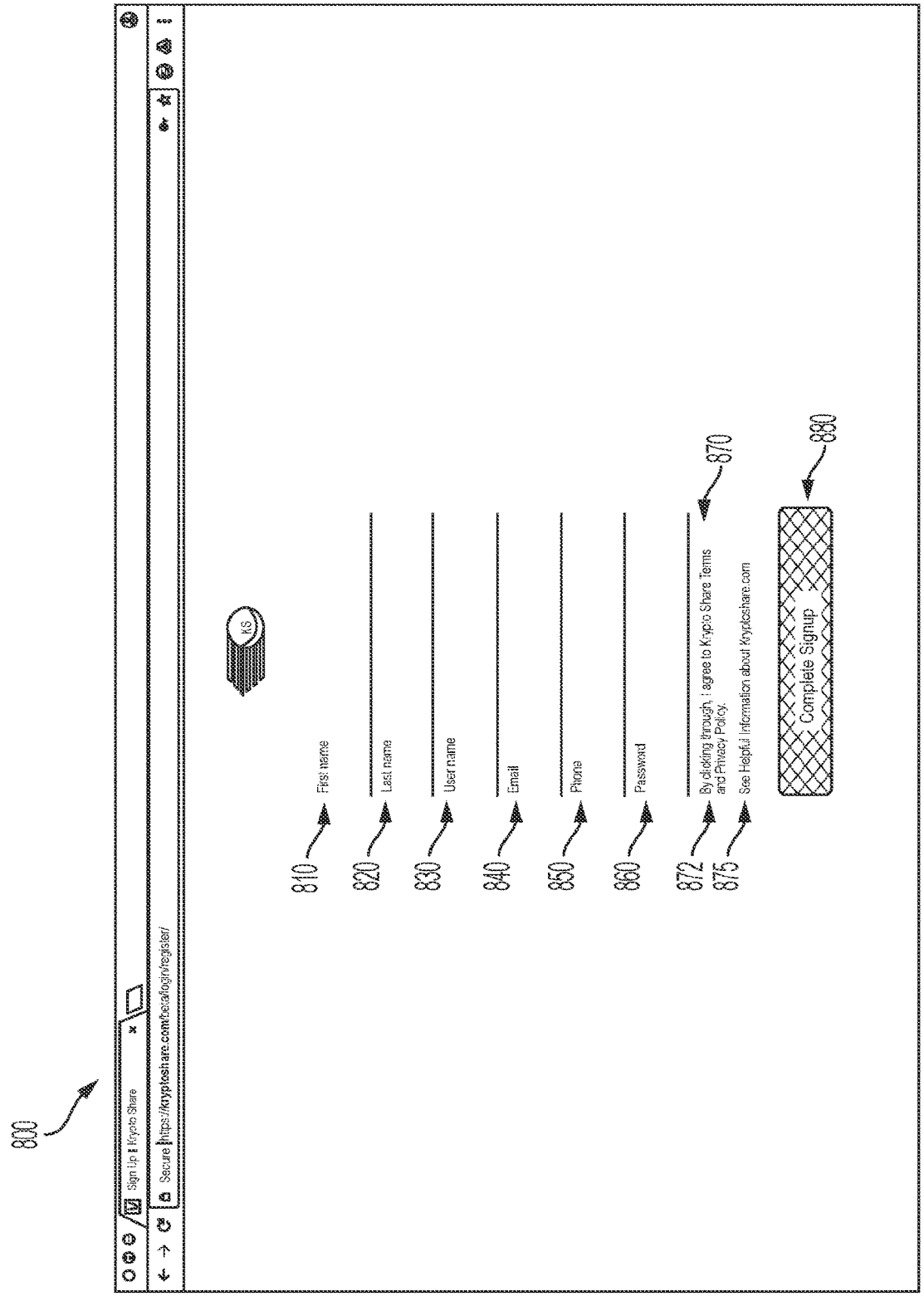
FIG. 8 shows an example registration GUI show to a user when registering with the asset transfer system according to an embodiment of the disclosure.

FIG. 8 shows an example registration GUI 800 shown to a user 215 when registering with the asset transfer system 100. A first name 810 and last name 820 entry field is present to accept an input from the user 215. While users 215 are encouraged to enter their full and real name, it is not required nor is providing any government ID required. This anonymity may be maintained if a user wishes to do so. Next, a "Username" field 830 is present for entry information from the new user 215. The username 830 is a unique name the user 215 will create for themselves. Usernames 830 are limited to one per email and one username per account. Once a username 830 is taken, it cannot be duplicated or re-used unless the rare chance where a system administrator of the asset transfer system 100 deletes the account and thus frees up the username 830 for re-use after an extended period of time. Once a username 830 is chosen it cannot be modified or edited. Then, an "Email" field 840 is present so that a user 215 can enter a contact email address. Users 215 will enter any of their email addresses which they wish to use for accessing the asset transfer system 100. Upon successfully completing the signup process, the asset transfer system 100 will send a confirmation email to the inputted email address to verify the registration. Below the "Email" field 840 is a "Phone" field 850 for user input. In the "Phone" field 850, users 215 are required to provide a phone number. This phone number can be used for two-step authentication and any verification security features of the asset transfer system 100. Additionally, in the event a user 215 become locked out of account or their email becomes compromised, the phone number may be used to contact the user 215 to regain access to the asset transfer system account 155. Finally, a "Password" field 860 is present to accept a user input. Users 215 will enter a password that will be used when logging into the asset transfer system 100 via either the website or mobile application. This password can be re-set or modified once users are successfully logged into the asset transfer system 100.

The registration GUI 800 also has tabs for "Terms and Conditions" 870, "Privacy Policy" 872, and "Helpful Information" 875 hyperlinks which may be selected by the user 215. The "Terms and Condition" hyperlink 870 will take users 215 to the terms and conditions page where they will be made aware of policies related to the asset transfer system 100. The "Privacy Policy" hyperlink 872 transfers the user to the same page discussed above on the homepage GUI 600. The "Helpful Information" hyperlink 875 may transfer the user to the "How It Works" 610 webpage discussed above on the homepage GUI 600. Finally, after all the information is correctly inputted into the fields of the GUI, a "Complete Signup" tab 880 is offered to be executed by the user 215. Once the user 215 clicks the "Complete Signup" tab 880 the user's registration to a valid user account 155 is performed. After this is complete, the user 215 will receive a confirmation email within a few minutes to the email address they entered on this registration GUI 800.

Figure 9:
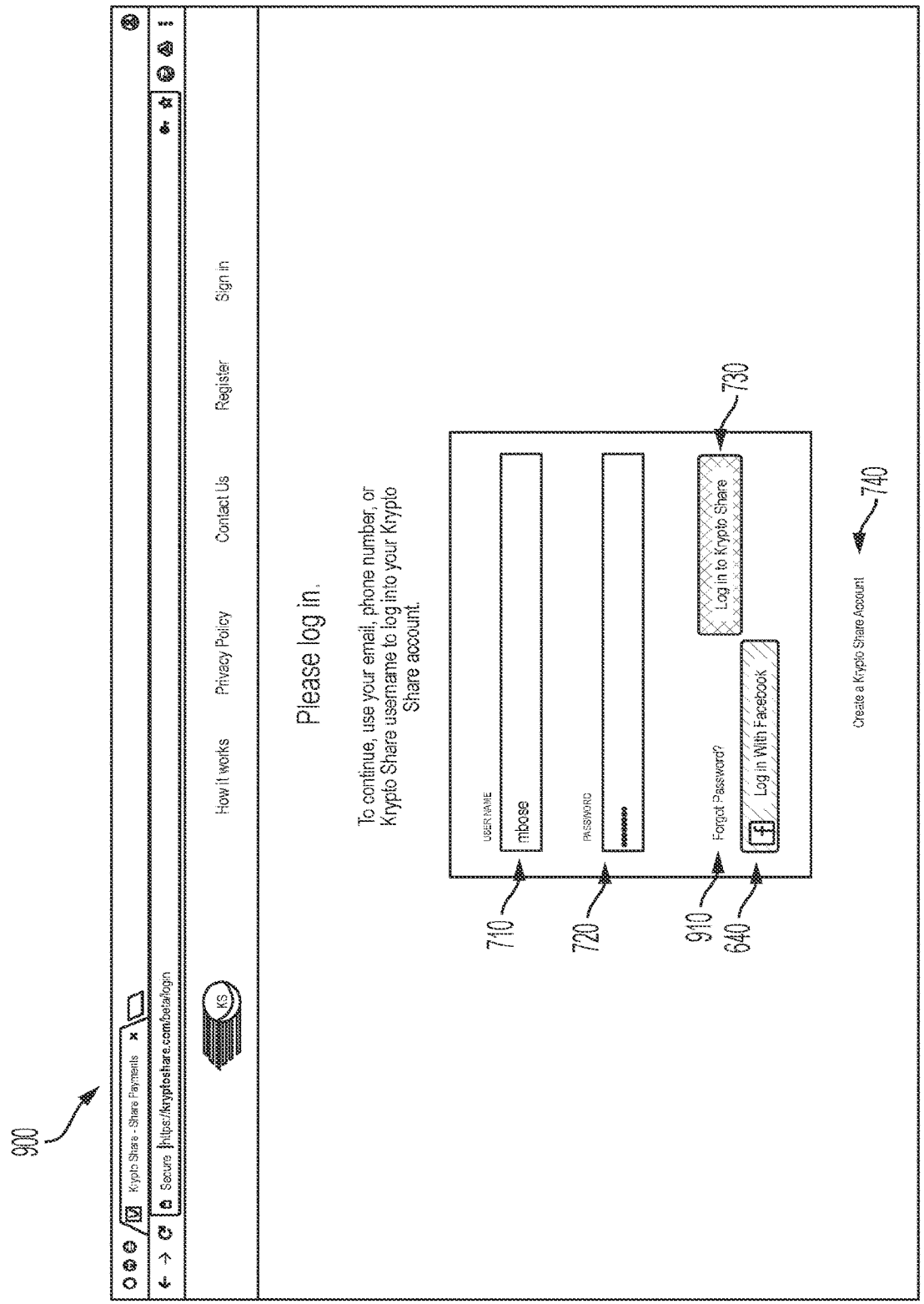
FIG. 9 shows another example login GUI when a user, already registered with the asset transfer system, attempts to log into the asset transfer system according to an embodiment of the disclosure.

FIG. 9 shows another example login GUI 900 when a user, already registered with the asset transfer system 100, attempts to log into the system. Users 215 will be directed to this login GUI 900 after they have properly registered an account and successfully confirmed that account via a confirmation email. The "Username" field 710 is where a user name will be entered by the registered user 215. The asset transfer system 100 uses data sharing cookies and once allowed by the user's selected browser this user name and password will be automatically stored and allow the user 215 to login right away without having to re-enter their username and/or password. The "Password" field 720 is where a user may enter the registration password for access to the user account 155.

A "Forgot Password" tab 910 is available if a user forgets their password. By clicking this link and filling out identifying information, the user 215 has the opportunity to have a password re-set email sent to them. The re-set email for password retrieval is only sent to the email on file when the user originally registered. The login GUI 900 will also have a "Log In With Facebook" link 640 so that users are able to use third party services to verify login credentials already saved on the asset transfer system 100. Also, once the appropriate fields are filled out, a user may click the log in link 730.

Field population for the required fields to use this log in link will be automated so long as the user 215 does not clear cookies or modify their password without saving it to the asset transfer system 100. The "Create a KryptoShare Account" link 740 functions similarly as discussed above. It is possible that a user 215 may have more than one user account 155. If a user 215 already has an account 155, they are allowed to have as many accounts 155 as they wish, but they must have different emails and usernames for each respective account 155.

Figure 10:
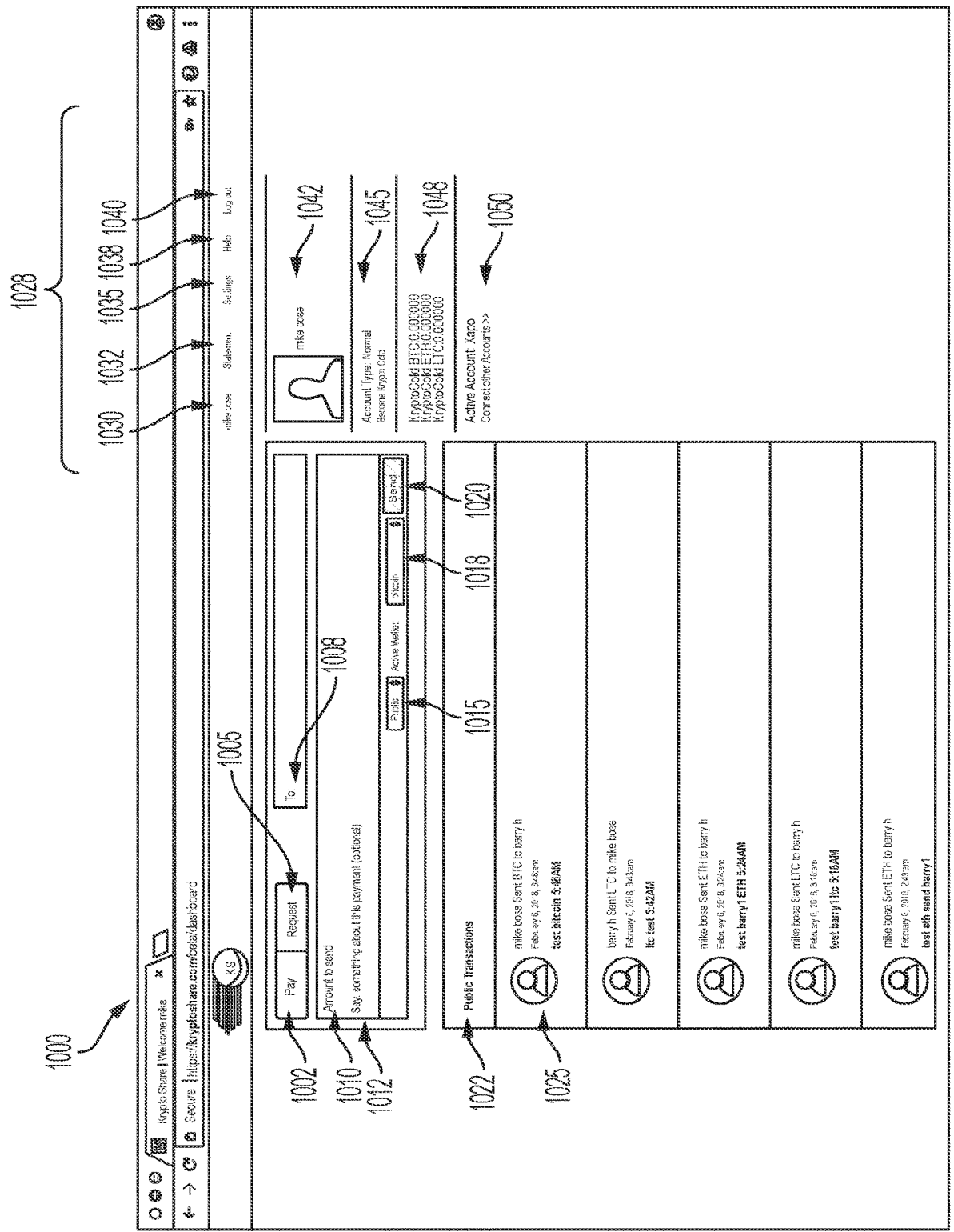
FIG. 10 shows an example dashboard GUI when a registered user logs into the asset transfer system according to an embodiment of the disclosure.

FIG. 10 shows an example dashboard GUI 1000 when a registered user 215 logs into the asset transfer system 100. Once a user 215 logs in successfully, the user 215 will see his/her specific dashboard. This is the main page where users 215 can decide from whom they wish to send and receive digital currency and/or assets 245 and to direct digital transactions 255.

A "Pay" tab 1002 is present and executable by the logged in user. The "Pay" 1002 feature allows the user 215 to send their choice of digital currency or asset 245 to a receiver account. By selecting pay, the user 215 is creating a transaction 255 where they become the sender of a chosen amount of digital currency. Clicking pay does not confirm the transaction 255, but it is required to complete the transaction 255. Once a transaction 255 is completed it will be viewable on the statement page of the asset transfer system 100.

A "Request" tab 1005 is also present and executable by the logged in user 215. The "Request" function 1005 allows a user 215 to send a request to another user of the asset transfer system 100 for a certain amount of digital currency/asset 245 specified by the sender. This does not cause a withdrawal of funds from the receiver of this request. The request merely notes a way in which one user may communicate their desire to procure funds from another user. Alternatively, the request could be for the receiver to provide a good/service to the sender of the request. In exchange, the sender of the request is promising to deliver a certain amount of digital currency/asset 245. The asset transfer system 100 does not delegate these agreements nor make any warranties of them. Once the request is completed, an email is sent on behalf of the requester to the receiver of said request by a centralized asset transfer system email specifying the amount, reason, time/date and user making the request. Receivers are not required to respond to any request. A transaction successful ID message may then be created on the dashboard page once the request is complete.

A "To" tab 1008 is present and executable by the logged in user 215. The "To" 1008 section is where the sender will type in the receiver's username. If the receiver's account is setup to receive the specific type of digital currency, the sender will see the username automatically generated as the sender is typing it in. If however, the receiver is not setup to receive the digital currency, the receiver's name will not appear. As a safeguard, if the receiver does indeed have an account which can accept the sender's selected type of digital currency, but that account is not 'active' (meaning the receiver is using a different wallet currently but has already integrated a wallet which can accept the sender's digital currency), the sender's selection to 'send' the selected digital currency will go into the receiver's other wallet which is capable of receiving the sender's digital currency. A sender never has to know what the receiver's public address is. The sender may only know the receiver's username.

An "Amount to Send" tab 1010 is present and executable by the logged in user 215. This tab allows senders of digital currency will select how much they wish to send to their selected receiver. For a transaction to be complete, input into this tab is required. Users must enter in a value with correct decimal places for the asset transfer system to take any action on the request.

A "Say Something About This Payment" tab 1012 is also present and executable by the logged in user 215. This tab provides an inputtable memo field where users 215 are given the opportunity to specify what the reason is for the payment. Users 215 may annotate the transaction however they wish. This annotated note is kept in the statement log for both the sender and the receiver so all parties are aware of why this transaction transpired. The inputtable memo field is also where users 215 using the "Request" function will type in the reason for their request. This section is not required to complete the transaction 255 between users 215 of the asset transfer system 100.

A "Public/Private" tab 1015 is also present and executable by the logged in user 215. By selecting the "Public/Private" tab 1015, users 215 are given the opportunity to have their transactions 255 become public or private. The requested transaction includes the time/date stamp for the digital currency/asset 245 that was sent and for what reason. If users wish to keep it private, they may do so and are also given the opportunity to turn a public transaction private even after it is made.

An "Active Wallet" tab 1018 is also present and executable by the logged in user 215. The "Active Wallet" tab 1018 allows senders to decide which type of digital currency/asset 245 they wish to send. In this example embodiment, the user 215 selected Bitcoin as the digital currency. In this embodiment, the asset transfer system 100 incorporates the three most popular digital currencies wallet systems in the world: Bitcoin (BTC), Ethereum (ETH) and Litecoin (LTC). However, as digital currencies grow and change constantly, additional embodiments are envisioned where the asset transfer system 100 can incorporate and add multiple different currencies for use on the disclosed platform. Users 215 must select a wallet that has the capability of sending the desired digital currency. For example, in one embodiment a XAPO wallet housed on a remote XAPO server can only send BTC and therefore the only option in this drop-down box for active wallet is Bitcoin. The asset transfer system 100 can adjust the drop down menu according to the known currencies or assets transferable on each specific remote database system. The drop down for active wallet is only limited to which wallet system users 215 have linked and if that wallet system is active. In another example, a user may have linked a Coinbase account, which can send/receive all three types of digital currency, but if the sending user's active account is XAPO, then the only option to send would be for Bitcoin, as that is the only common digital currency available between the two user wallets.

A "Send" tab 1020 is also present and executable by the logged in user 215. The "Send" tab 1020 is the final confirmation option inputted by the user 215 to facilitate the transaction 255. By executing the send function, the asset transfer system 100 sends the desired action to the receiver whether it is a request or an amount of digital currency, assuming the sender filled in the previous areas correctly. The asset transfer system 100 makes a call to the database 125 of the selected user wallet 220 and that user wallet 220 sends out messages to the network of nodes to move the placement of digital currency to the receiver's respective wallet. Once the digital 'send' 1020 option is successfully selected, the asset transfer system 100 computes verification of the transaction sending action within fractions of a second and generates a recordation of the transaction to the statement page for both the receiver and the sender. If the action is 'Pay' and the database 125 of the wallet system is down for maintenance or any other reason, a message will appear via the asset transfer system 100 to the sender that the remote database 125 is down, therefore this requested action will not be generated on the statement page for either the sender or receiver. The user wallet 220, synonymous with the user's public address, and the user's private key signs the movement of digital currency to confirm with the other nodes that the transaction 255 is to occur. Once verified by the other nodes of the remote server network, the digital currency is placed into the possession of the receiver and the receiver's wallet.

A "Public Transactions" tab is also present and executable by the logged in user. The "Public Transactions" tab is a list where transactions chosen to be made public are visible to other users. If a user wishes a transaction to be private, they may choose to set it to private even after the transaction was originally made public.

Below the "Public Transactions" tab 1022, there is a list of "Transaction Histories" 1025 viewable on the dashboard GUI 1000. The "Transaction Histories" 1025 lists all transactions 255 made by the user 215 as public transactions. In some embodiments, these transactions 255 may be made public to all users of the asset transfer system 100 and will contain information regarding the sender's and receiver's name, as well as the date of transaction and the reason for said transaction. Transactions 255 are displayed in order of most recent to oldest transactions.

A navigable menu 1028 is also located at the top of the dashboard GUI 1000. The navigable menu 1028 may have a "USER NAME" tab 1030 executable by a logged in user 215. The "USER NAME" tab 1030 is the name of logged in user's specific account 155. In the viewed embodiment, the logged in user account 155 belongs to Mike Bose. Other accounts 155 will have their own name appear in this section of asset transfer system 100. The "USER NAME" tab 1030 is also a hyperlink which takes users 215 to their profile section where they can modify some their personal details should they chose to do so.

The navigable menu 1028 may also have a "Statement" tab 1032 executable by a logged in user 215. This statement option 1032 is a hyperlink which when selected will take users to see their statement history. The statement history shows all requests and transmissions of funds. It is from here that a user 215 can change public transactions private should they chose to do so.

The navigable menu 1028 may also have a "Settings" tab 1035 executable by a logged in user 215. This "Settings" tab 1035 is a hyperlink which also takes users 215 to same area where the username tab 1030 does. Here the users 215 can modify some of their personal details through linking to "Settings." This option can be modified for premium users who may change credit card or payment information pertaining to upgraded services.

The navigable menu 1028 may also have a "Help" tab 1038 executable by a logged in user. This "Help" tab 1038 is a hyperlink which takes users to the "Contact Us" page 620 described above that currently provides users the option to email the asset transfer system's support services.

The navigable menu 1028 may have a "Logout" tab 1040 executable by a logged in user 215. This option logs the user 215 out of their account 155 but does not clear their saved user name or password.

Below the navigable menu 1028 a hyperlink and profile image 1042 of the user 215 may be present. This hyperlink links to same place as selecting the "USER NAME" tab 1030. An upload profile image may be displayed to the left of the user name associated with the account 155. If users 215 are logged in through a third party service, such as Facebook, their avatar or Facebook picture will appear.

The dashboard GUI 1000 also displays an "Account Type" notification 1045 and a "Become Krypto Gold" hyperlink. The "Account Type" section 1045 lets users 215 know whether or not they have access to the premium features of the asset transfer system 100. The hyperlink takes users 215 to the cold storage section of the statements page 1032 where users 215 can select which cold storage subscription they would like for a selected amount of time determined by the user. Accounts 155 will be displayed as "normal" if they do not have access to the premium features of the asset transfer system 100 paid for and thereby enabled.

Below these features, a "KryptoCold BTC, ETH, LTC" notification 1048 may be present. These displayed values report to the user 215 the amount of digital currency that users 215 have chosen to put into the cold storage section of the asset transfer system 100.

Finally, an "Active Account" tab 1050 displays the account 155 currently selected by the user 215. For example, in this embodiment, the XAPO user wallet is currently selected. This display shows which digital currency wallet system users have chosen to link. When sending digital currency, the user wallet 220 that digital currency is being pulled from is the one that is displayed in the "Active Account" tab 1050. Users 215 have the option to choose a different account 155 by selecting the hyperlink text "Connect Other Accounts". Users 215 are only able to send whatever digital currency their user wallets 220 support. For example, this user dashboard has XAPO active, which is a Bitcoin only wallet and therefore can only send Bitcoin. Any Bitcoin sent from any of the integrated user wallets 220 when being sent to this user 215 will appear in their active account, and in this example, their XAPO account.

Figure 11:
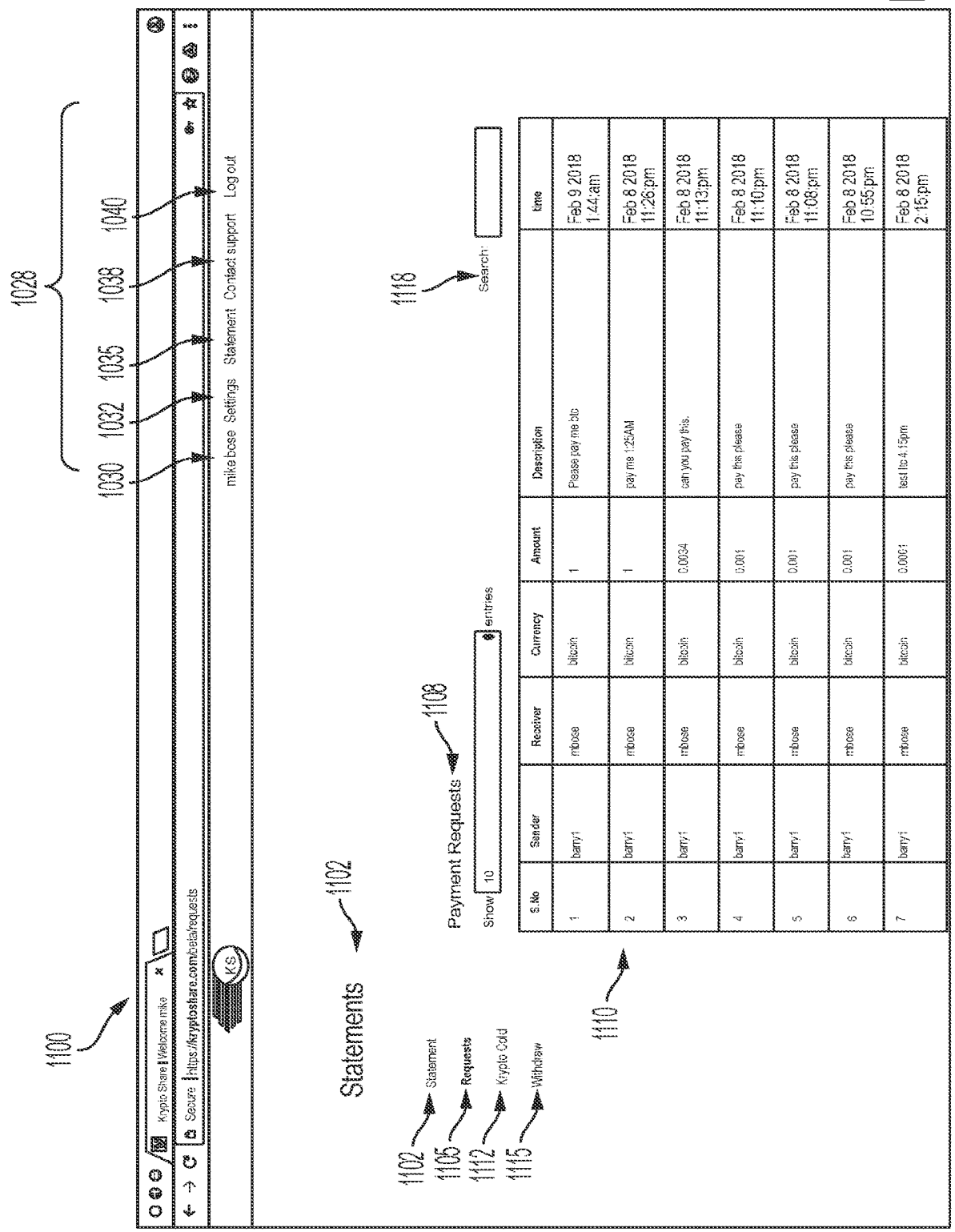
FIG. 11 shows an example request GUI when a registered user logs into the asset transfer system and accesses the request page according to an embodiment of the disclosure.

FIG. 11 shows an example request GUI 1100 when a registered user 215 logs into the asset transfer system 100 and accesses the request page. When a user 215 receives requests, they will appear as a subsection of the statements hyperlink text 1102. A user 215 clicks on the "Requests" section 1105 on the left and this representative data is loaded. No requests are mandatory to use the asset transfer system 100. Requests are an option for users 215 to help them engage with their peers on the asset transfer system 100.

At the top of the requests GUI is a navigable menu 1028. This navigable menu 1028 is the same as the dashboard GUI 1000 and links to the appreciable services and webpages of the "User Name" 1030, "Settings" 1032, "Statements" 1035, "Contact Support" 1038, and "Log Out" 1040 tabs.

By clicking the requests link 1105 of the requests GUI 1100, a "Payment Requests" table 1108 appears where a list of user transactions requested by the user 215 are displayed. The payment requests data box 1110 shows requests when the user 215 selects the sub-hypertext "Requests". The user 215 can also control the amount of requests displayed by allowing them to choose from the "Show Entries" dropdown box.

The side navigable menu of the requests GUI also contains a "Statement" tab 1102. By selecting the "Statement" tab 1102, users 215 are taken to the general statement data that organizes all data, both transactions 255 and requests by sender, receiver, the currency, amount, reason, date/time and option to turn transactions private. This overarching view of all statement actions helps users 215 keep track of incoming transactions 255 as well as past transactions 255 and provides details for these transactions 255.

The side navigable menu of the requests GUI also contains a "KryptoCold" tab 1112. This "KryptoCold" 1112 hyperlink text takes users 215 to the cold storage page where they are able to purchase cold storage options and select how long they wish to have the premium cold storage available to them.

The side navigable menu of the requests GUI 1100 also contains a "Withdraw" tab 1115. Users 215 who are also customers of the premium cold storage service can withdraw what they have in cold storage by selecting this. If users 215 are normal users without cold storage access, this hypertext link will take them to the dashboard page 1000 where they can register for cold storage access to become premium members of the asset transfer system 100.

The data box 1110 of the requests GUI 1100 shows all requests sent to a particular user 215. This box of data is populated with only the requests the user has received and updated continuously. Users 215 are also emailed by the asset transfer system 100 every time they receive a request. These requests are organized by receiver, sender, amount, description (created by the sender) and time. Requests are always kept private.

The requests GUI 1100 may also have an inputtable search field 1118. The search feature 1118 allows users to search their statement record by digital currency, name, or time.

Figure 12:
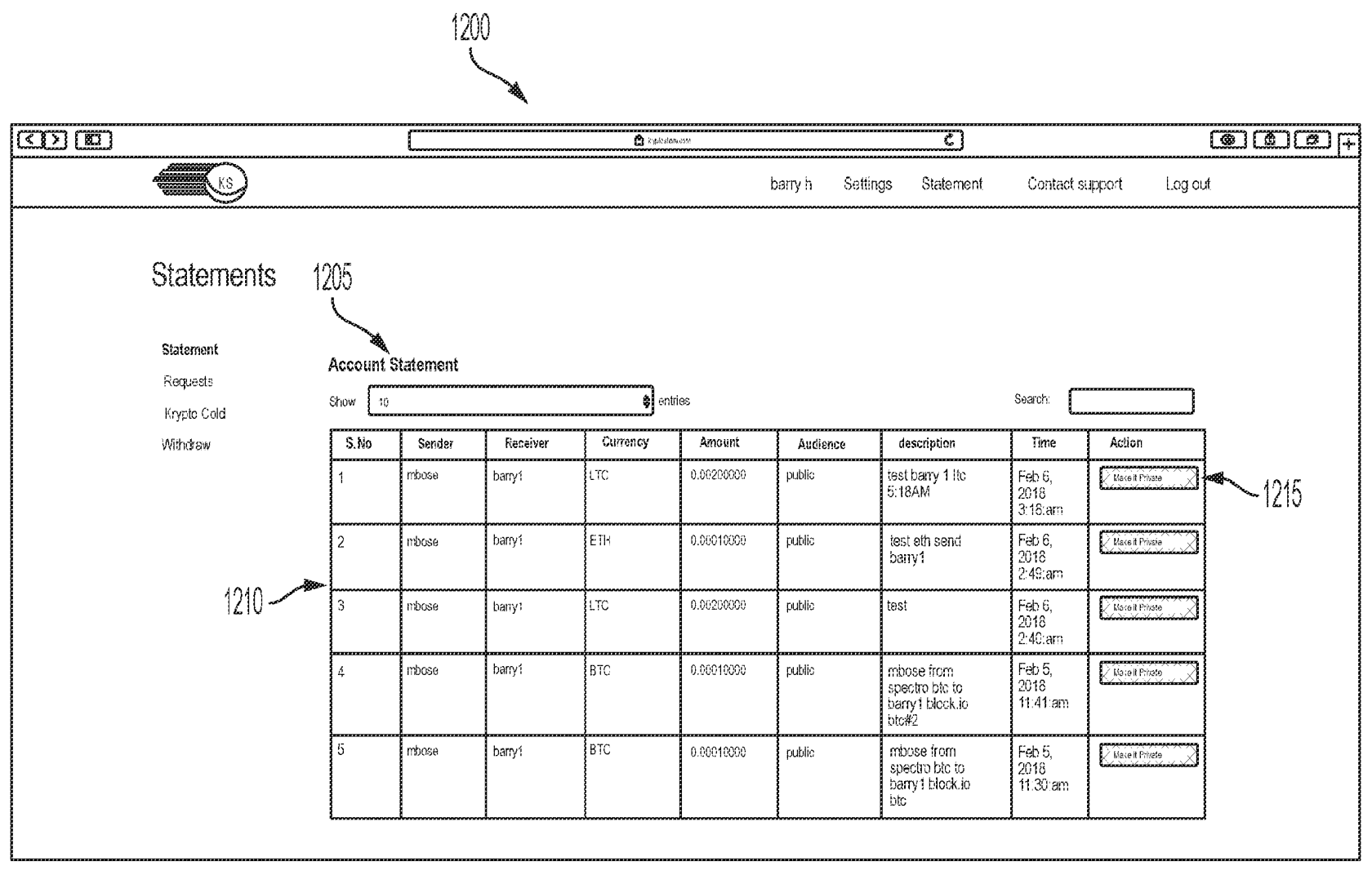

FIG. 12 shows an example statement GUI 1200 when a registered user 215 logs into the asset transfer system 100 and accesses the statement page. The information of the statement page allows users 215 to view their entire statements in chronological order of all requests and transmissions of funds. The statements GUI 1200 has many of the same navigable menus and functionalities as the requests GUI 1100. Additionally, an "Account Statement' header 1205 is present above a statement data box 1210. The account statement is the title to the main statement page displaying all types of transactions sending and requests. Users 215 are able to select how many transactions 255 they want to be displayed.

The statement data box 1210 has all the requests and transactions the user 215 has received. These requests and transmissions are organized by receiver, sender, amount, description (created by the sender) and time. Requests are always kept private and transmissions can be public or private at the discretion of the user 215. On the statement GUI 1200, there is also a "Make It Private" option 1215 clickable by a user 215. This option allows users who have previously made transactions 255 public the ability to make them private. The feature is optional and selectable based on the wishes and desired of the user 215 of the account 155.

Figure 13:
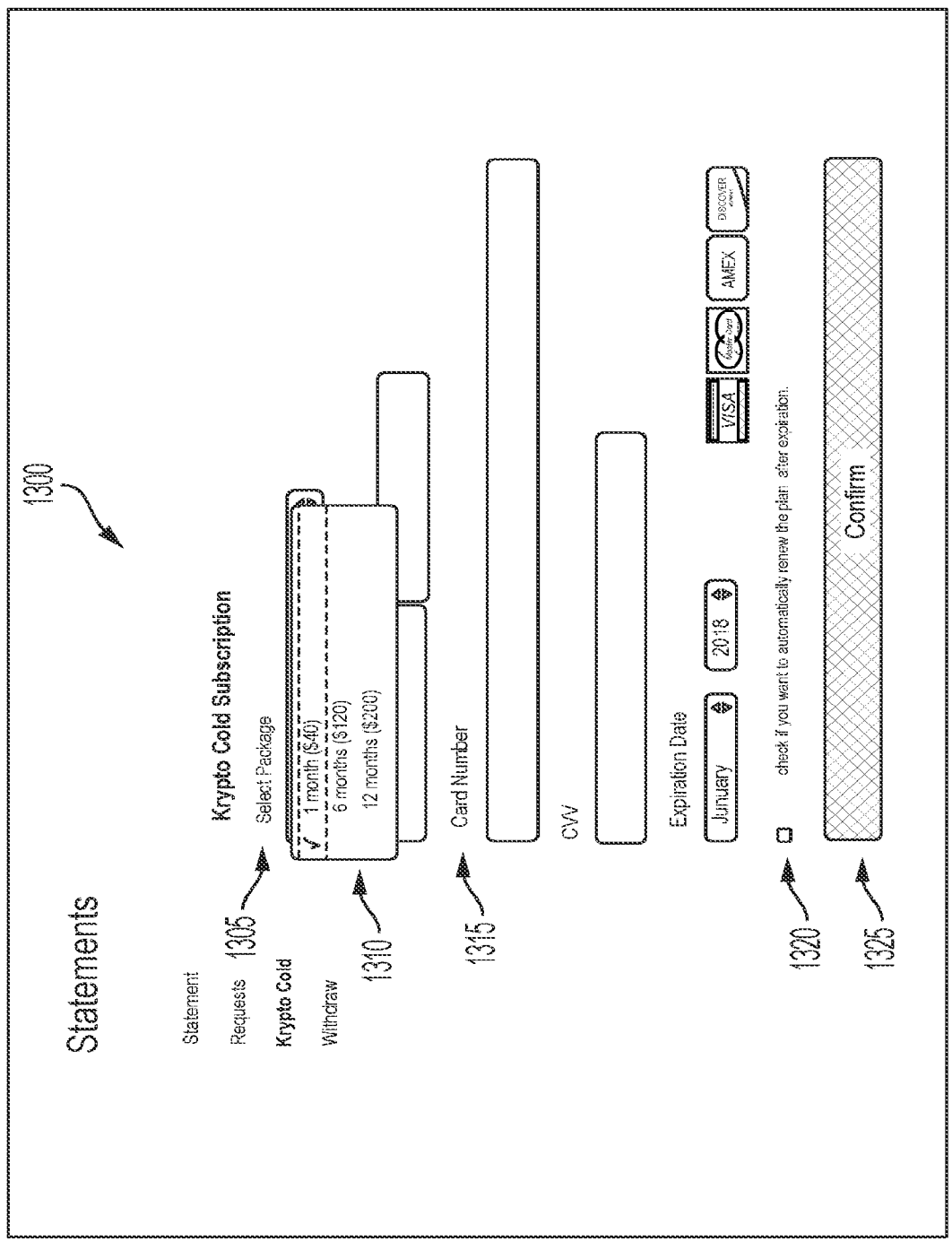
FIG. 13 shows an example cold storage GUI when a registered user logs into the asset transfer system and accesses the cold storage page according to an embodiment of the disclosure.

FIG. 13 shows an example cold storage GUI 1300 when a registered user 215 logs into the asset transfer system 100 and accesses the cold storage page. The cold storage GUI 1300 has many of the same navigable menus and functionalities as the requests and statement GUIs 1100 and 1200. The cold storage option is envisioned to be a premium service of the asset transfer system 100. This cold storage option is located in the memory 135 of the computer system 110 hosting the asset transfer system 100 and it is not connectable to the asset transfer system 100. The cold storage remains offline during routine operations of the asset transfer system 100 and only interacts with the asset transfer system 100 at the express instruction of a user 215 wishing to retrieve funds from the cold storage. The cold storage is the storage of the BTC, ETH and LTC on an offline device.

On the cold storage GUI 1300, a "Select Package" tab 1305 is executable by a user 215 located on the page. This "Select Package" tab 1305 is the dropdown menu to select which monthly package users 215 wish to sign up for housing there digital assets 245 within the cold storage. A "Monthlies" tab 1310 allows cold storage subscribers to be billed on a monthly basis for $40/month, 6 months for $120 and 12 months for $200. Data fields 1315 are inputtable for user information such as First Name, Last Name, Credit Card Number, Expiration Date of Credit Card, and/or CVV code for credit card access. A check box 1320 is also present agreeing to the terms and condition of the cold storage option of the asset transfer system 100, as well as offering an auto-renewal feature of the cold storage service. Once a user 215 believes all the inputted information into the data fields 1315 is correct, a user 215 may execute a confirm tab 1325 to begin using the cold storage service.

Figure 14:
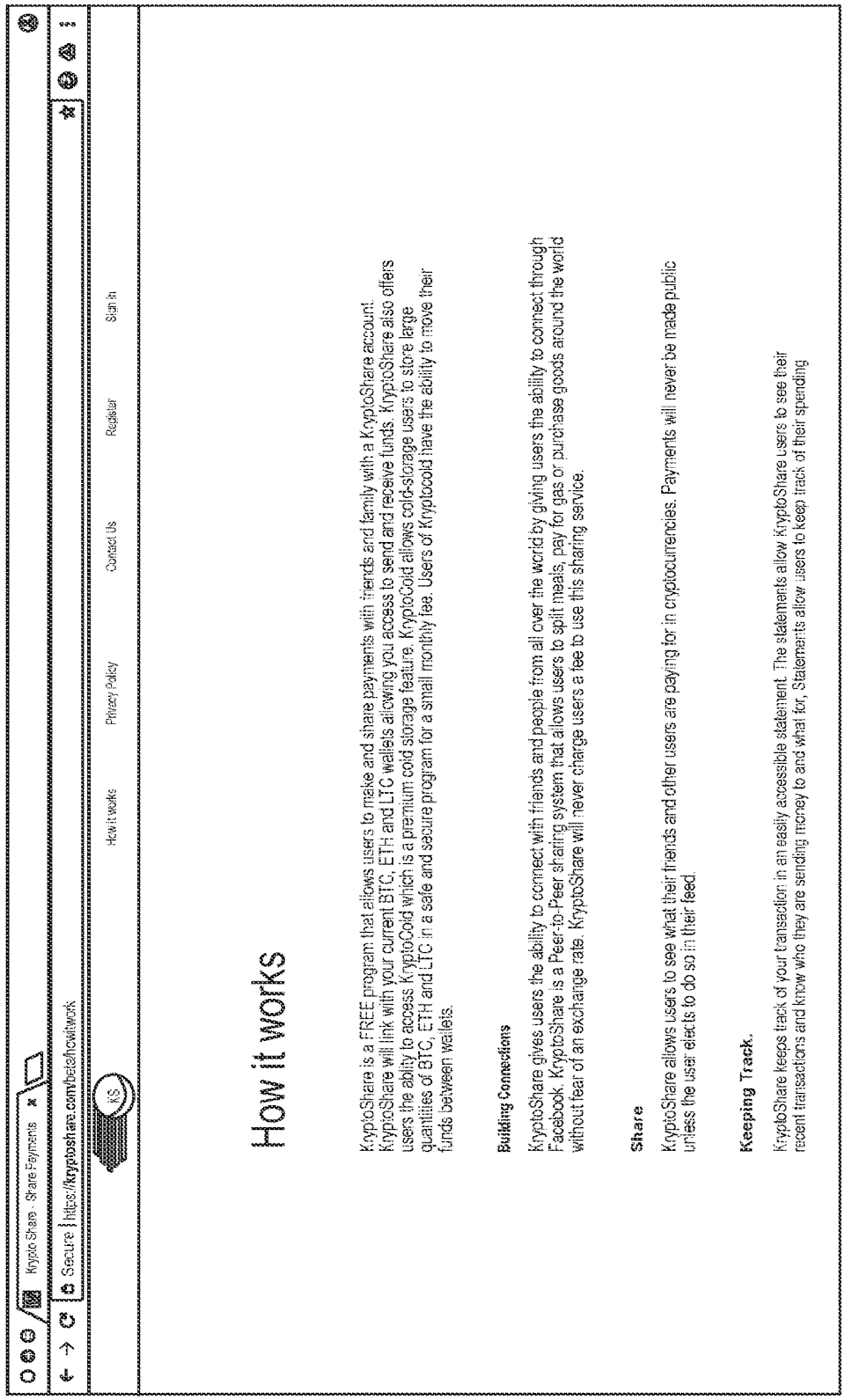
FIG. 14 shows a how it works GUI when a user of the asset transfer system is taken to the how it works page according to an embodiment of the disclosure.

FIG. 14 is a how it works GUI 1400 when a user 215 of the asset transfer system 100 is taken to the how it works page. The how it works page is described above and shows users 215 of the asset transfer system 100 what they need to do to integrate remote database user wallet accounts 220. The how it works page also allows users to understand how the asset transfer system 100 works without revealing proprietary information, but enough information to educate users 215 of the program.

Figure 15:
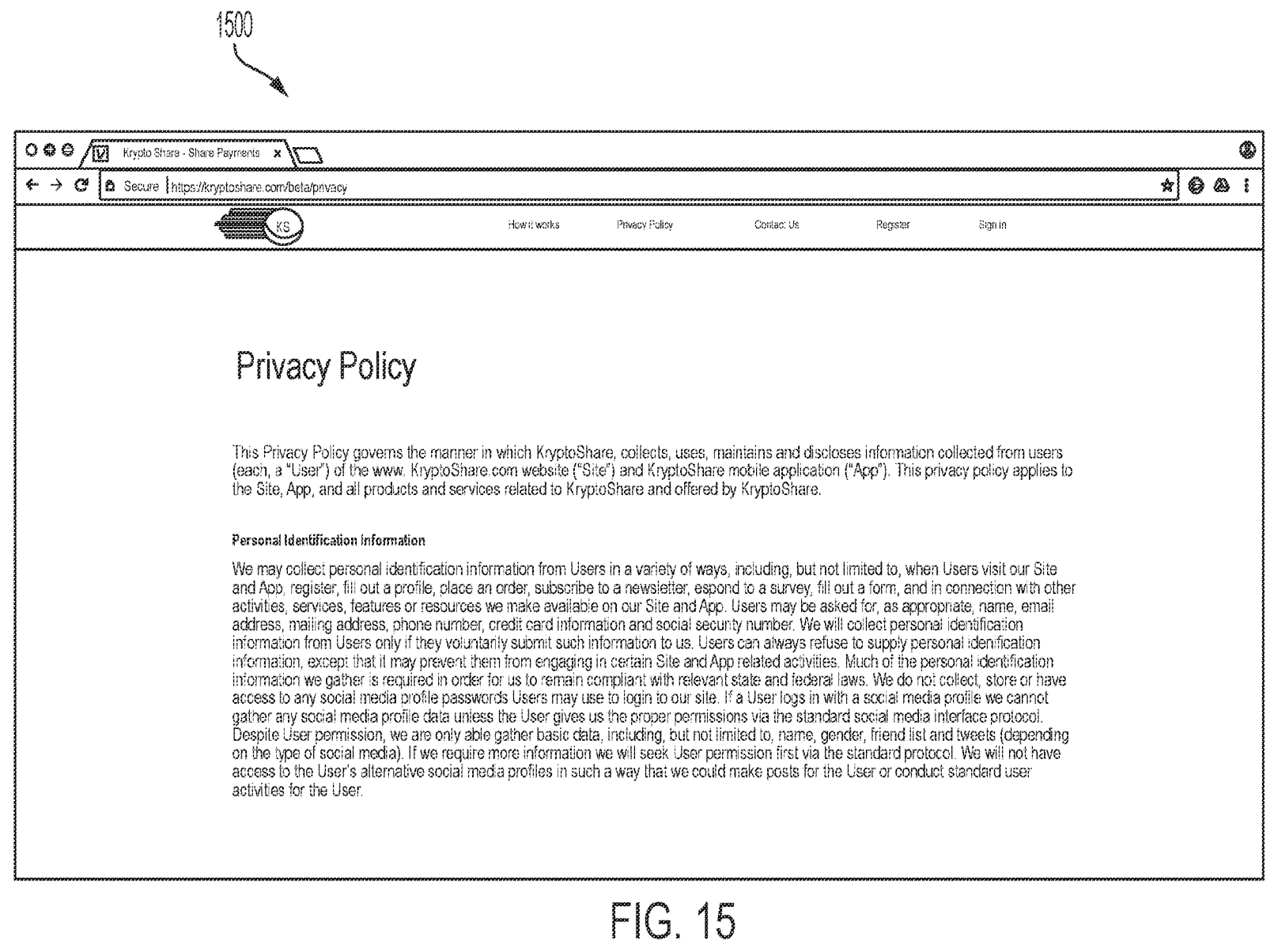

FIG. 15 is a privacy policy GUI 1500 when a user 215 of the asset transfer system 100 is taken to the privacy policy page. The privacy policy page is described above and is available for users 215 who are and are not yet registered with the asset transfer system 100. All users 215 are directed to review asset transfer system's privacy policy.

Figure 16:
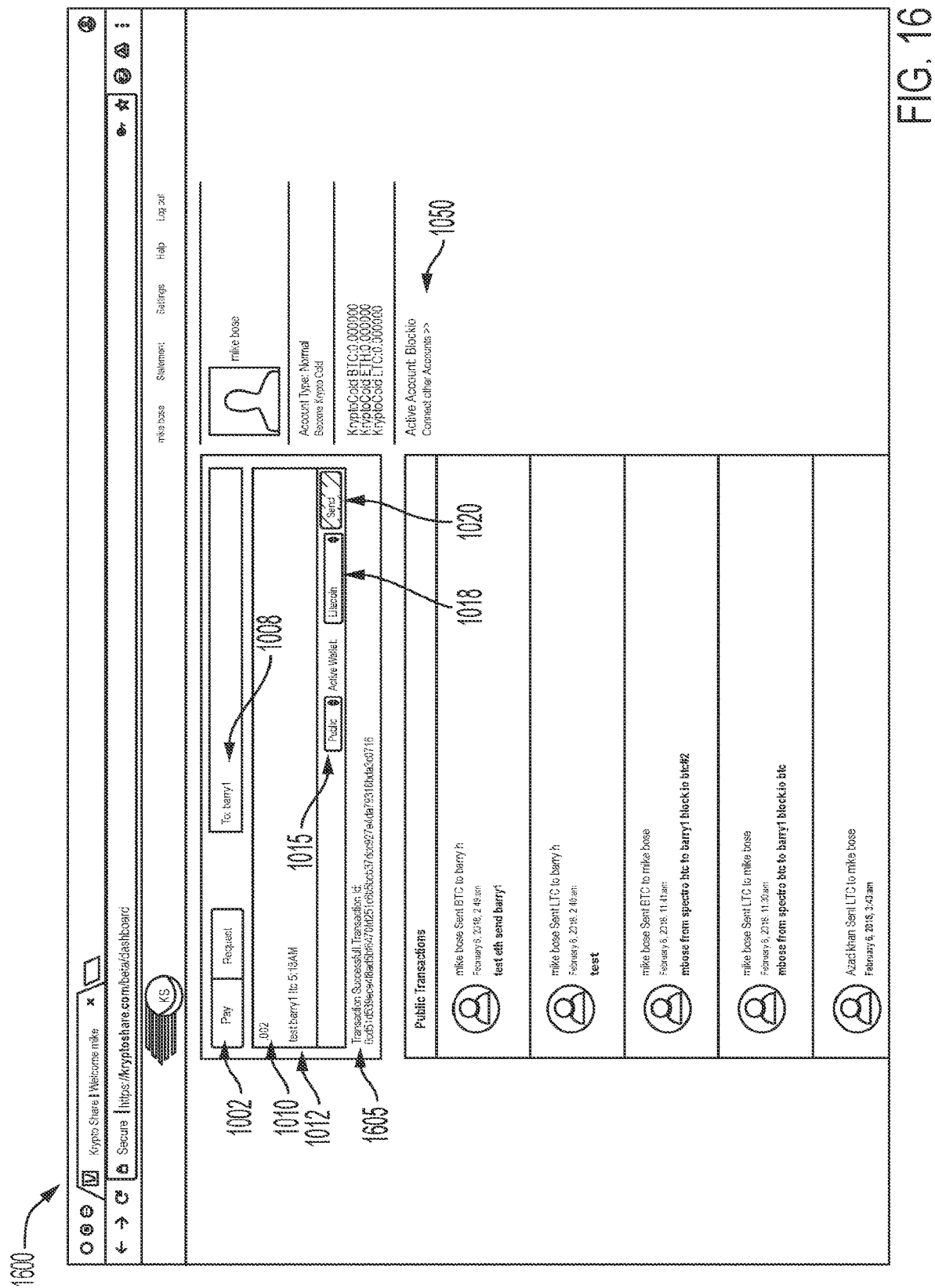
FIG. 16 illustrates an example transaction GUI when a user inputs the necessary information to perform a transaction and transfer of digital assets on the asset transfer system according to an embodiment of the disclosure.

FIG. 16 is an example transaction GUI 1600 when a user 215 inputs the necessary information to perform a transaction 255 and transfer of digital assets 245 on the asset transfer system 100. The transaction GUI 1600 lets a user 215 know a transaction 255 has occurred that lets the sender also know they have successfully generated a transaction 255 to another user.

In this example, the "Pay" tab 1002 successfully reports that the sender, "mike bose", has successfully sent a specified amount of Litecoin to their fellow asset transfer system user barry1. The "Amount to Send" area 1010 with the "0.002" is where senders of digital currency/assets 245 will select how much they wish to send to their selected receiver. Inputting a currency amount in this section is required. Users 215 must enter in a value with decimal places. In this example transaction 255, the sender has chosen to send 0.002 Litecoin to the receiver. Below the amount of currency to be sent, the transaction GUI 1600 reports the message inputted into the "Say Something About This Payment" section 1012 of the sending request. In this example transaction, the sender chose to type 'test barry 1 ltc 5:18 AM' but senders are welcome to put whatever they wish in this box.

Below these transaction details, a transaction ID 1605 is reported to the sender via this transaction GUI 1600. This is the transaction ID 1605 which is created by the administrator of the asset transfer system 100. By creating a transaction ID 1605, the administrator can monitor the level of usage of its asset transfer system users, as well as assess the data of what various digital currencies are being used for. This also lets the user 215 know that the transaction 255 was created and performed successfully. When the transaction 255 occurs, it is added immediately to the statement for both receiver and sender.

Transaction histories which are made public will have the sender's and receiver's name, as well as the date of transaction and the reason for said transaction 255. Transactions 255 are displayed in order of most recent to oldest transactions.

The "Public/Private" toggle 1015 allows the user to determine how they wish to have their transactions displayed. The "Active Wallet" toggle 1018 is where senders will decide which type of digital currency they wish to send. The asset transfer system 100 has incorporated the three most popular digital currencies wallet systems in the world: Bitcoin (BTC), Litecoin (LTC) and Ethereum (ETH). Yet, as described, other currencies and assets may be added as they increase in popularity or at the wishes of the administrators of the asset transfer system 100. Users 215 must select a user wallet 220 that has the capability of sending the desired digital currency. In this example transaction, a "Block.io" wallet only can send BTC and LTC. Therefore, the user has two options present in this drop down toggle 1018. The drop down for active user wallet 220 is limited to only which wallet system users have linked and if that wallet system is active. A user 215 may have linked a Coinbase account, which can send/receive all three types of digital currency, but if the sending user's active account is Block.io, then the only option to send would be for Bitcoin or Litecoin. In this example, this user 215 has chosen to send Litecoin and has done so with success.

In the transaction example above, the sender has pressed "send" 1020 and the end result is a successful transmission of Litecoin to the receiver. The "To" tab 1008 of this example is similar to the disclosure of the "To" tab 1008 above. In the "To" tab 1008, the sender will type in the receiver's username. In this example, the sender has put in the user name 'barry1.' If the receiver's account 155 is setup to receive the specific type of digital currency, the sender will see the username automatically generated as the sender is typing it in. If, however, the receiver is not setup to receive the digital currency the sender is wishing to send, the name will not appear. As a safeguard, if the receiver does indeed have an account which can accept the sender's selected type of digital currency, but that account is not 'active' (meaning the receiver is using a different wallet currently), yet the receiver has already integrated a wallet which can accept the sender's digital currency, then if the sender selects 'send' after manually typing in the whole username, that digital currency will go into the receiver's other wallet which is capable of receiving the sender's digital currency. A sender never has to know what the receiver's public address is. The sender must only know receiver's user name or if the receiver is connected to a third party service, such as Facebook, know their Facebook name to send funds. Since barry1 is setup to receive the selected digital currency, this user's name auto filled in the "To" window within the first few letters being typed, much like how an online search will auto fill the text a user is typing. Had it not auto filled, that would be a red flag that this user 215 may not be setup to receive the digital currency user wishes to send them.

The "Active Account" tab 1050 in this example is similar to the active account tab described above. This tab display shows which digital currency user wallet 220 the user 215 has chosen to link. When sending digital currency, the user wallet 220 that digital currency is being pulled from is the one that is displayed in "Active Account" 1050. Users 215 have the option to choose a different account by selecting the hyperlink text "Connect Other Account". Users 215 are only able to send whatever digital currency their wallets support. For example, this user 215 has Block.io active, which is a Bitcoin and Litecoin only user wallet 220 and, therefore, can only send Bitcoin and Litecoin. When this user 215 is being sent Bitcoin or Litecoin from another user, it will appear in their active user wallet 220, in this example their 'Block.io' account.

Figure 17:
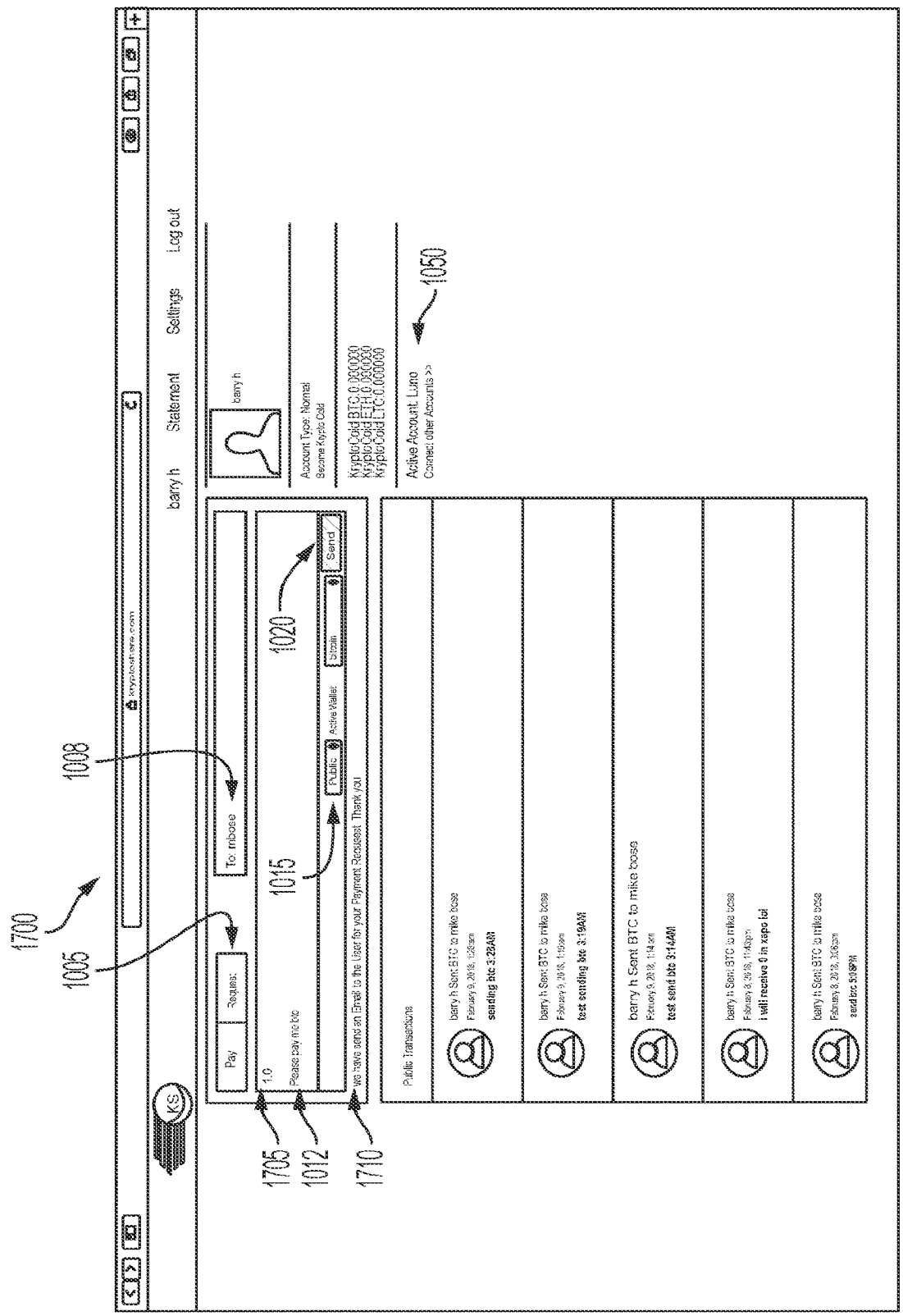
FIG. 17 is an example request transaction GUI that has successfully occurred in the asset transfer system according to an embodiment of the disclosure.

FIG. 17 is an example request transaction GUI 1700 that has successfully occurred. These requests do not deduct balances from the receiver or the sender.

In this example, 'barry h', has chosen to send a "Request" 1005. Selecting a request is required to confirm the transaction, but it does not complete. Only by selecting 'send' 1020 will the transaction be completed, pending the corresponding fields are correctly filled out.

A value 1705 is then inputted as to the amount of digital currency requested in the requesting statement. This area is where senders of digital currency will select how much they wish to send to their selected receiver or how much they are requesting. Inputting a requested amount in this section is required. Users 215 must enter in a value with decimal places. In this example request transaction, the sender has chosen to request 1.0 bitcoin from the receiver. Below the amount of currency to be requested, the example request transaction GUI reports the message inputted into the "Say Something About This Payment" section 1012 of the request. In this example transaction, the sender of the request has chosen to type in "please pay me btc" but senders are welcome to put anything they wish in this section and are not required to complete it.

In the "To" tab 1008, the sender will type in the receiver's username. In this example, the sender has put in the user name 'mbose.' Regardless of what type of wallet the receiver of a request has, they will always receive all requests. Sending funds has a different set of rules than a request for funds.

The "Active Wallet" tab 1015 in this example is similar to the active wallet tab 1015 described above. This is where senders will decide which type of digital currency they wish to request. The asset transfer system 100, discussed above, has incorporated the three most popular digital currencies wallet systems in the world, Bitcoin (BTC), Litecoin (LTC) and Ethereum (ETH). Users must select a user wallet 220 that has the capability of sending the desired digital currency for 'pay' function only. If the user 215 is only requesting funds, the user 215 can send a request for any currency from the drop-down box.

By activating the "send" input 1020, the user 215 completes the request transaction 255. Once send 1020 is selected, it is made available immediately in the "Statement" section and an email is sent to the receiver by the asset transfer system 100 with the reason for request, time, currency type, and sender of the request's name.

A "Notification" section 1710 lets the sender know that the request has been sent successfully. Unlike sending funds, a transaction ID is not generated for "Request" as no calls to wallet servers are made for requests. All requests are made privately and cannot be public unless desired by the user.

The "Active Account" tab 1050 in this example is similar to the active account tab 1050 described above. This tab display shows which digital currency wallet system the users 215 have chosen to link. When sending digital currency, the user wallet 220 that digital currency is being pulled from is the one that is displayed in "Active Account" 1050. Users 215 have the option to choose a different account by selecting the hyperlink text "Connect Other Accounts". Users are only able to send whatever digital currency their user wallets 220 support. For this request example, this user 215 has a LUNO wallet active, which is a Bitcoin only wallet, and therefore can only send Bitcoin. Any Bitcoin sent from any of the integrated wallets when being sent to this user will appear in their active account, in this example their LUNO account. Because this transaction 255 is a request, no digital currency is being sent by either user.

Figure 18:
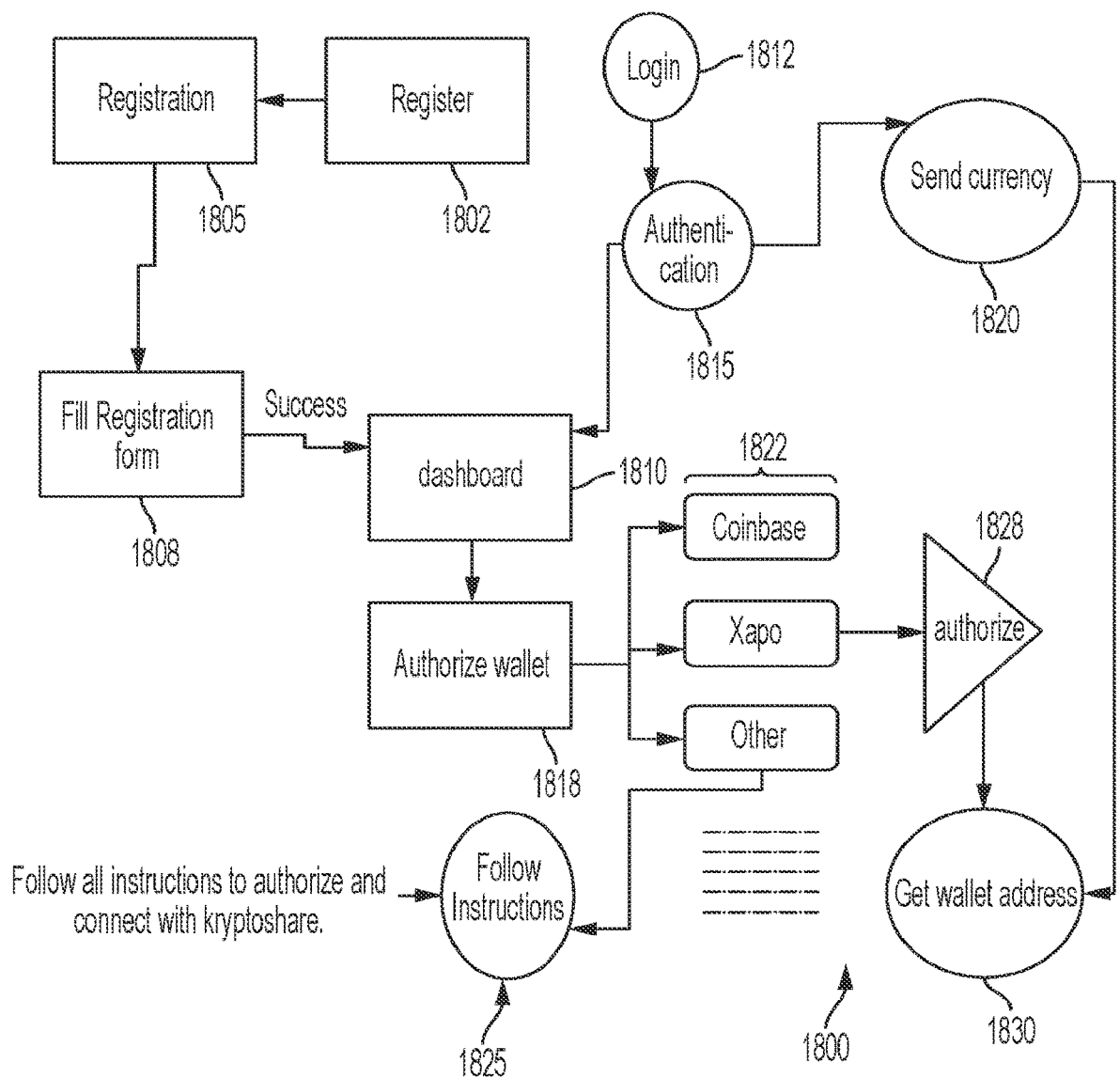
FIG. 18 represents an overall flow process where a user may access the asset transfer system, register for a user account, attach a user wallet to the user account, and perform transfers of digital assets according to an embodiment of the disclosure.

FIG. 18 represented an overall flow process 1800 where a user 215 may access the asset transfer system 100, register for a user account 1802, attach a user wallet 220 to the user account 155, and in turn perform transfers of digital assets 245. A user 215 accessing the asset transfer system 100 for the first time will be asked to register through the registration process 1805 described above. Once on the registration GUI 800, the user 215 will fill out a text fillable form 1808 to transmit to the asset transfer system 100 to verify and create a user account 155 for the user 215. Once the registration form 1808 is filled out and confirmed by two-factor authentication and email confirmation the user 215 and associated user account 155 is added to the data logic of the asset transfer system 100. At this point, a user 215 may progress to a dashboard GUI 1810 in order to fully use and execute features of the asset transfer system 100.

Users 215 already registered and returning to the asset transfer system 100 will not have to undergo the registration process a second time. Those users will be presented a login GUI 1812 where username and password credentials may be inputted to gain access to the asset transfer system 100. After the username and password are authenticated 1815 by the security of the asset transfer system 100, the user may be taken to a dashboard GUI 1810 to execute the features of the asset transfer system 100.

From the dashboard 1810, the user may either authorize wallets 1818 to his/her existing user accounts or, if a user wallet 220 is already present, send and request digital currency 1820 transactions. To add an authorized wallet 1818, the user 215 may input the user wallet 220 he wishes to add and the asset transfer system 100 will communicate with the remote database 125 of the user wallet 220 to obtain identification information by use of the curl function 1822. Once the user follows the instructions 1825 of the remote database 125 to attach the user wallet 220 to the asset transfer system 100, the user wallet 220 is able to then be used as an origination and reception point for the transfer or digital currencies. After authorizing a user's access 1828 to the user wallet 220 through the remote database 125 housing the user wallet 220, the wallet address 1830 or public key is communicated back to the asset transfer system 100. Knowing now the public key and in some instances the private key for access to these user wallets 220, the user 215 can send and request digital assets 245 and currencies through the asset transfer system 100.

Figure 19:
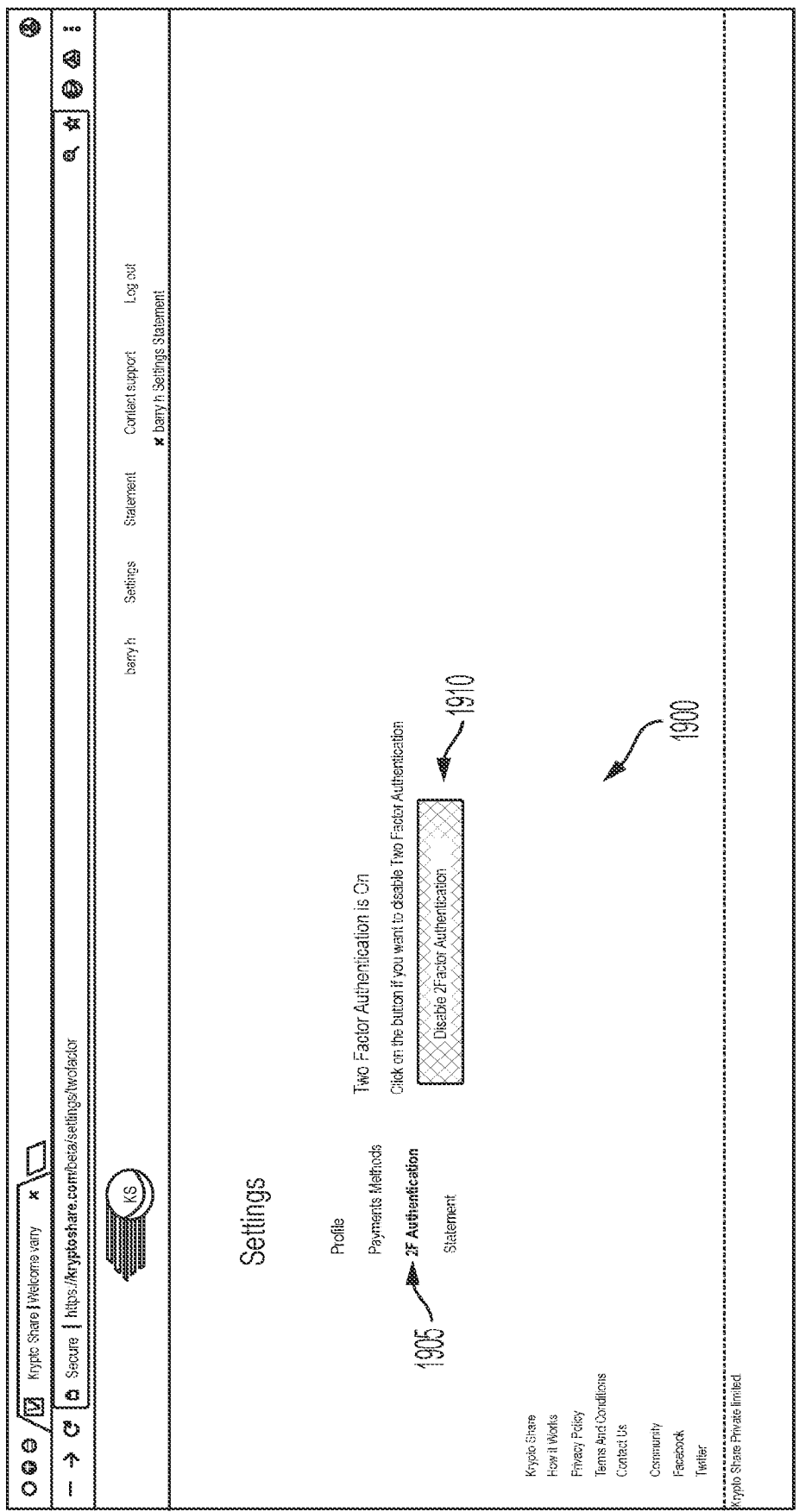
FIG. 19 is an example two-factor authentication GUI according to an embodiment of the disclosure.

FIG. 19 is an example two-factor authentication GUI 1900 that may be presented to a user 215 when they are logging into the asset transfer system 100. The two-factor authentication GUI 1900 is what a user 215 may see if two-factor authentication is enabled. The user 215 will be prompted to enter a code when first logging into the asset transfer system 100, either from a personal computing device or from the computer system 110. Should a user 215 not elect to have two-factor authentication, they may still log into the asset transfer system 100 without such additional security. The "2FA Authentication" tab 1905 allows users 215 to link an authenticator feature to their account 155. If users 215 elect this feature, they are required to have an authenticator application every time they wish to log into the asset transfer system 100. Additionally, a "Disable 2Factor Authentication" button 1910 may be present. Selecting this button allows users 215 to turn off two-factor authentication. Logged in users 215 who already activated two-factor authentication may disable two-factor authentication from this button. It is only possible to turn off two-factor authentication once a user 215 who has setup the two-factor authentication has logged into the asset transfer system 100.

Figure 20:
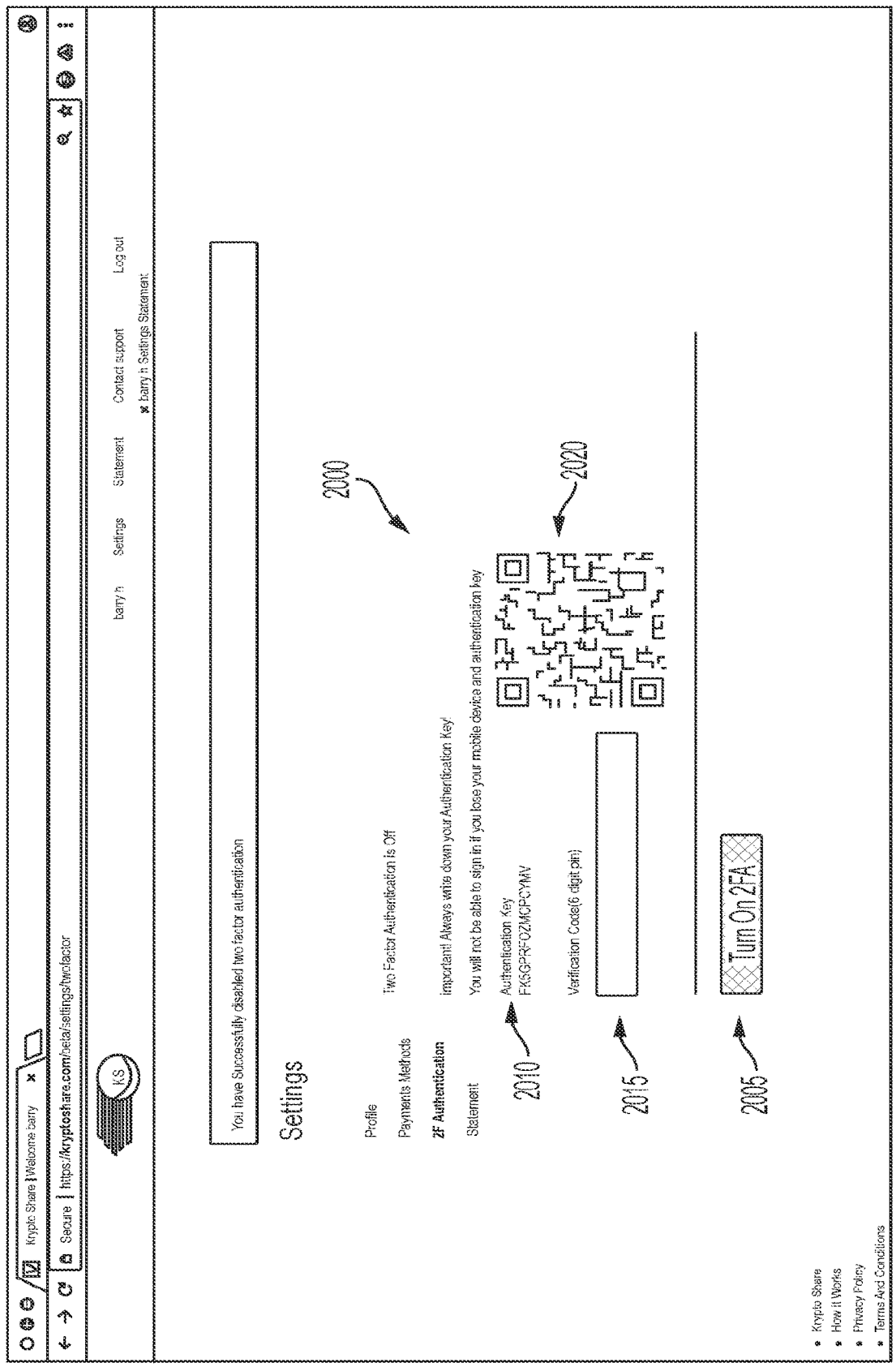
FIG. 20 is an example two-factor authentication setup GUI according to an embodiment of the disclosure.

FIG. 20 is an example two-factor authentication setup GUI 2000 that may be presented to a user 215 when they wish to add two-factor authentication to their user account 155. A "Turn on 2FA" button 2005 is present which may be selected once all the verification information is correctly entered. The two-factor authentication setup GUI 2000 provides the user 215 the authentication key 2010 associated with the user account 155. To authenticate entry into the asset transfer system 100, a user 215 may input a verification code 2015 into a provided text box. The verification code 2015 can be provided to the user 215 from an authentication application (not shown). When logging into the asset transfer system 100, the authentication application generates a unique code based on shared secret information and a current time. Then, the user 215 must manually submit this code. The computer system 110 housing the asset transfer system 100 generates the exact same code based on the same secret (i.e., authentication key 2010) in order to compare and validate the login request. The first time a user 215 completes this process, the authentication application and the asset transfer system 100 are synced together. Two-factor authentication prevents a third party knowing both a user's password and login ID access to the user account 155 unless the third party also has access to the authentication application. In an additional embodiment, the user 215 may scan a QR code 2020 with a camera of a personal electronic device. The QR code 2020 helps register the authentication application to a specific user account 155 and can be used in lieu of entering the manual verification code 2015.

Figure 21:
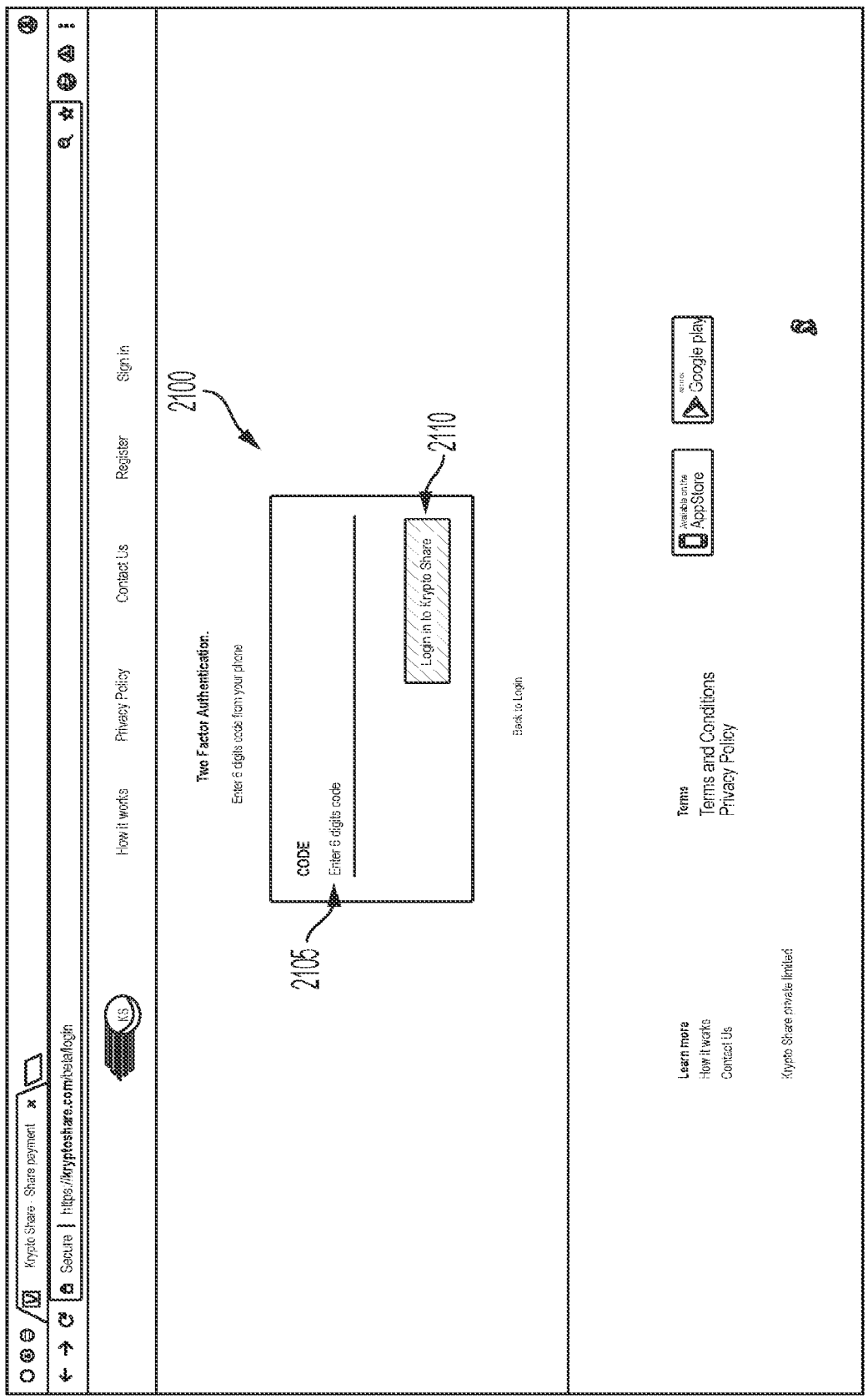
FIG. 21 is an example activated two-factor authentication GUI according to an embodiment of the disclosure.

FIG. 21 is an example activated two-factor authentication GUI 2100 that may be presented to a user 215 previously registered to use the two-factor authentication with their user account 155. When two-factor authentication is active, users 215 must enter a six digit code to access the asset transfer system 100. In this GUI, a code entry 2105 is present were users 215 will enter a six digit generated code from the authenticator application. Upon successfully entering the six digit code, a user 215 may select the "Log Into KryptoShare" button 2110 which will allow them to enter the asset transfer system 100. If the six digit code is incorrect, the user 215 will be prompted to re-enter a new six digit code. Successive failures to enter the correct six digit code may prompt a lock out of the user account 155 by the asset transfer system 100. From there, a user 215 may have to take additional steps and undergo additional verification to re-enter the asset transfer system 100.

Figure 22:
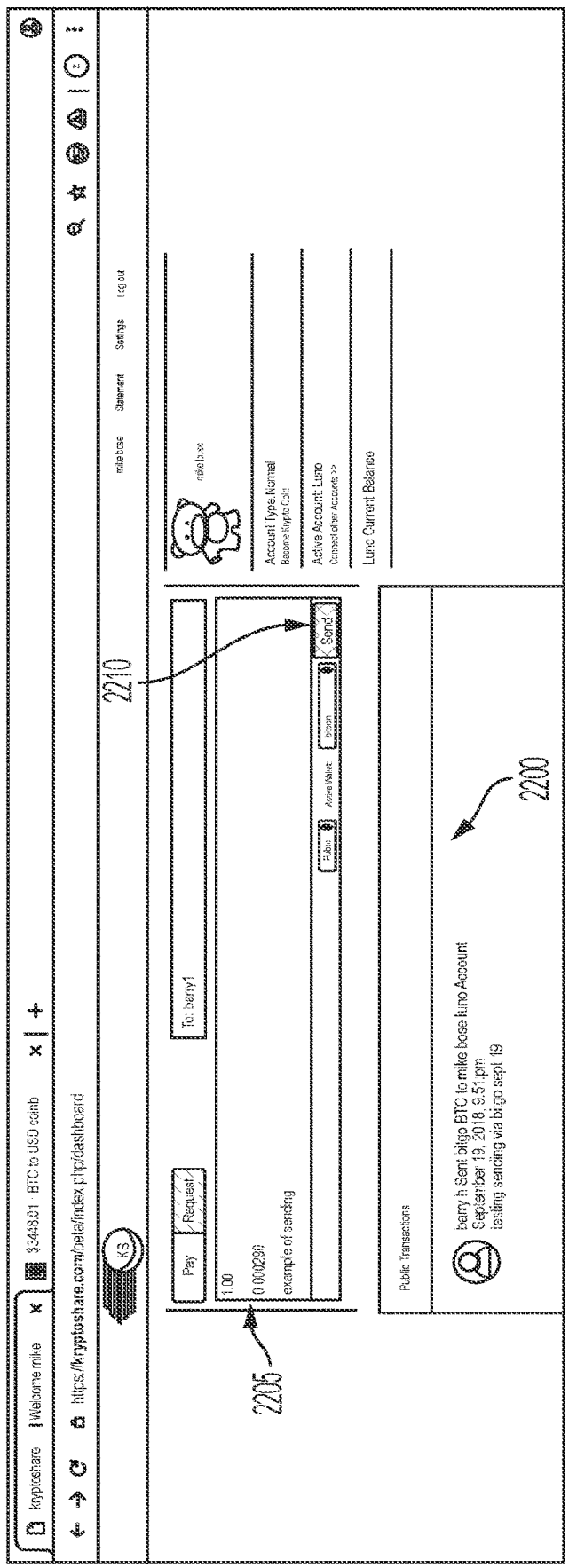
FIG. 22 is an alternative dashboard GUI according to an embodiment of the disclosure.

FIG. 22 shows an alternative dashboard GUI 2200 when a registered user 215 logs into the asset transfer system 100. This alternative dashboard GUI 2200 has all the same features of the dashboard GUI described in FIG. 10. However, in this alternative embodiment, a conversion mechanism is offered to the user 215 so that the user 215 may realize and understand the fiat currency value of the digital currency or digital asset 245 transferred using the asset transfer system 100. Like similar embodiments described above, a transaction amount 2205 is entered into a text box. However, in this alternate embodiment, the transaction amount 2205 will be a value of fiat currency. A second line of the text box will represent the digital currency/digital asset 145 equivalent to the amount of fiat currency entered above. A conversion algorithm operated by the asset transfer system 100 converts the amount of fiat currency to the same amount of digital currency/digital assets 145. This conversion algorithm may be updated in real time or periodically as determined by the asset transfer system 100 so that up to date and relevant currency calculations are being performed. From there, when the user 215 is ready to move forward with the transaction 255, the send button 2210 is selected and the appropriate amount of digital currency/digital assets 245 are sent to the recipient based on the requested transaction amount 2205.

The embodiments were chosen and described in order to best explain the principles of the invention and its practical application to thereby enable others skilled in the art to best utilize the invention in various embodiments and with various modifications as are suited to the particular use contemplated.

As various modifications could be made in the constructions and methods herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

What is claimed is:

1. An asset transfer system comprising:
   a network interface through which electronic content is received, the electronic content comprising a plurality of transactions for receipt by a plurality of users associated with a plurality of user accounts of the asset transfer system;
   a memory that comprises (1) a first plurality of memory addresses that are arranged as a plurality of user accounts, each account associated with a user and a user wallet, (2) a second plurality of memory addresses that are arranged as a data structure that associates the plurality of user accounts with each the user wallet and a wallet location, and (3) a third plurality of memory address that associates the plurality of user accounts with transactions; and
   a processor for cooperation with the memory and the network interface, the processor configured to:
   call the wallet location storing the user wallet;
   verify a digital asset and a digital asset value at the wallet location;
   command a transaction associated with the digital asset and the digital asset value for performance;
   separate the transaction between a sender's public key and a receiver's public key;
   obtain an authenticated digital asset value;
   attach a sender signature to the authenticated digital asset value to create a network transaction call;
   a call to a plurality of nodes within a computing network to verify the network transaction call; and
   draft a statement detailing the transaction associated with the user wallet.

2. The asset transfer system of claim 1, wherein the processor will take users to see a statement history that displays all requests and transmissions of funds.

3. The asset transfer system of claim 2, wherein the processor is able to change public transactions to private transactions.

4. The asset transfer system of claim 1, further comprising a cold storage system for monetary assets accessible by the user.

5. The asset transfer system of claim 4, wherein the cold storage system stores user information including First Name, Last Name, Credit Card Number, Expiration Date of Credit Card, and CW code for credit card access.

6. The asset transfer system of claim 1, wherein the third plurality of memory addresses further associates transactions with (1) a timestamp, (2) a first user wallet, (3) a second user wallet, (4) the digital asset, and (5) the digital asset value.

7. The asset transfer system of claim 1, wherein the draft statement contains a timestamp, the digital asset, the digital asset value, a sending user, a receiving user, and a memo reported to the plurality of users associated with the transaction.

8. The asset transfer system of claim 1, wherein the separation of the transaction is performed at the wallet location.

9. The asset transfer system of claim 1,
   wherein obtaining an authentication digital asset value comprises a proof of work algorithm executed on the digital asset value associated with the sender's public key;
   wherein execution of a hash of the proof of work algorithm associates the authenticated digital asset value with the receiver as a new block of a blockchain; and
   wherein a receiver's signature verifies the authenticity of the hash and new block of the blockchain.

10. The asset transfer system of claim 1, wherein the digital asset is a digital currency.

11. An asset transfer system comprising:
    a network interface through which electronic content is received, the electronic content comprising a plurality of transactions for receipt by a plurality of users associated with a plurality of user accounts of the asset transfer system;
    a memory that comprises (1) a first plurality of memory addresses that are arranged as a plurality of user accounts, each account associated with a user and a user wallet, (2) a second plurality of memory addresses that are arranged as a data structure that associates the plurality of user accounts with each the user wallet and a wallet location, and (3) a third plurality of memory address that associates the plurality of user accounts with transactions; and
    a processor for cooperation with the memory and the network interface, the processor configured to:
    call the wallet location storing the user wallet;
    verify a digital asset and a digital asset value at the wallet location;
    command a transaction associated with the digital asset and the digital asset value for performance;
    separate the transaction between a sender's public key and a receiver's public key;
    obtain an authenticated digital asset value;
    attach a sender signature to the authenticated digital asset value to create a network transaction call;
    a call to a plurality of nodes within a computing network to verify the network transaction call;
    draft a statement detailing the transaction associated with the user wallet;
    take users to see a statement history that displays all requests and transmissions of funds; and
    allow users to access a cold storage system of monetary assets.

12. The asset transfer system of claim 11, wherein the processor is able to change public transactions to private transactions.

13. The asset transfer system of claim 11, wherein the cold storage monetary asset system stores user information including First Name, Last Name, Credit Card Number, Expiration Date of Credit Card, and CW code for credit card access.

14. The asset transfer system of claim 11, wherein the third plurality of memory addresses of the first database further associates transactions with (1) a timestamp, (2) a first user wallet, (3) a second user wallet, (4) the digital asset, and (5) the digital asset value.

15. The asset transfer system of claim 11, wherein the draft statement contains a timestamp, the digital asset, the digital asset value, a sending user, a receiving user, and a memo reported to the plurality of users within the first database and associated with the transaction.

16. The asset transfer system of claim 11, wherein a statement update is reported to the plurality of users within the first database upon verification of the transaction.

17. The asset transfer system of claim 11, wherein the digital asset is a digital currency.

18. A computer program product comprising:
a plurality of processor-executable instructions that are resident on a non-transitory computer-readable storage medium, wherein the instructions, upon execution by a processor, are configured to cause the processor to:
receive registration requests from a plurality of users;
in response to the received registration requests, for each of a plurality of the users, (1) validate an electronic mail address for the user, and (2) create an account for the user; receive user wallet requests from a plurality of users;
in response to the received user wallet requests, for each of a plurality of the users, (1) validate a user wallet on a remote database, and (2) associate the user account with the user wallet;
receive a plurality of electronic content items from the remote database, wherein the received electronic content items are a plurality of transactions for receipt by a plurality of users associated with a plurality of user accounts;
store the received plurality of transactions in the accounts for the users;
provide users with access to electronic content items stored in their accounts via a GUI display;
call the remote database storing the user wallet;
verify a digital asset and a digital asset value stored on the remote database and associated with the user wallet;
command a transaction associated with the digital asset and the digital asset value for performance by the remote database;
separating the transaction on the remote database between a sender's public key and a receiver's public key;
executing a proof of work algorithm for the digital asset value on the remote database, the proof of work algorithm associated with the sender's public key to obtain an authenticated digital asset value;
attaching a sender signature to the authenticated digital asset value including a sender's private key to create a network transaction call on the remote database;
calling a plurality of nodes interconnected with the remote database to verify the network transaction call;
upon verification of the network transaction call, associate the authenticated digital asset value with the receiver's public key in the remote database;
execute a hash of the proof of work algorithm within the remote database to associate the authenticated digital asset value with the receiver as a new block of a blockchain;
draft a statement to be viewed via the GUI display detailing the transaction associated with the user wallet;
report the statement to the plurality of users associated with the transaction; and
access a cold storage system of monetary assets.

19. The computer program product according to claim 18, further comprising viewing a statement history that displays all requests and transmissions of funds.

20. The computer program product according to claim 18, wherein the cold storage monetary asset system stores user information including First Name, Last Name, Credit Card Number, Expiration Date of Credit Card, and CW code for credit card access.

* * * * *